US011646975B2

(12) United States Patent
Rushton et al.

(10) Patent No.: US 11,646,975 B2
(45) Date of Patent: May 9, 2023

(54) SYSTEM AND METHOD FOR COMPARTMENT QUOTAS IN A CLOUD INFRASTRUCTURE ENVIRONMENT

(71) Applicant: ORACLE INTERNATIONAL CORPORATION, Redwood Shores, CA (US)

(72) Inventors: Matthew Rushton, Seattle, WA (US); Rajesh Basa, Seattle, WA (US); Hunt Graham, Seattle, WA (US); Marek Czajka, Seattle, WA (US); Philip Newman, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/986,162

(22) Filed: Aug. 5, 2020

(65) Prior Publication Data
US 2021/0044540 A1  Feb. 11, 2021

Related U.S. Application Data

(60) Provisional application No. 62/884,994, filed on Aug. 9, 2019, provisional application No. 62/884,936, filed (Continued)

(51) Int. Cl.
*H04L 47/78* (2022.01)
*H04L 47/70* (2022.01)
(Continued)

(52) U.S. Cl.
CPC ............ *H04L 47/782* (2013.01); *G06F 9/505* (2013.01); *G06F 9/5072* (2013.01);
(Continued)

(58) Field of Classification Search
CPC ......... G06F 11/3006; G06F 2209/5022; G06F 2209/504; G06F 9/505; G06F 9/5072; G06F 9/5077; H04L 41/0806; H04L 41/0893; H04L 41/5006; H04L 41/5077; H04L 41/5096; H04L 41/76; H04L 41/782; H04L 41/829; Y02D 10/00
See application file for complete search history.

(56) References Cited

U.S. PATENT DOCUMENTS 7,406,694 B2   7/2008  Sen
7,421,560 B2   9/2008  Thind
(Continued)

OTHER PUBLICATIONS

Apache Cloudstack, Apache CloudStack developers guide, "Quota Plugin", © Copyright 2016, Apache Software Foundation, 4 pages.
(Continued)

*Primary Examiner* — Dung B Huynh
(74) *Attorney, Agent, or Firm* — Tucker Ellis LLP

(57) ABSTRACT

Systems and methods described herein support compartment quotas in a cloud infrastructure environment. Cloud administrators do not generally have the ability to restrict resource usage in existing clouds. Granting a user permission to create resources allows them to create any number of resources up to a predefined account limit. Compartment quotas allow admins to restrict a user's resource usage to the appropriate level allowing fine-tuned cost control.

20 Claims, 21 Drawing Sheets

Related U.S. Application Data on Aug. 9, 2019, provisional application No. 62/884,998, filed on Aug. 9, 2019.

(51) Int. Cl.

| | |
|---|---|
| *H04L 41/50* | (2022.01) |
| *G06F 9/50* | (2006.01) |
| *H04L 41/0893* | (2022.01) |
| *H04L 41/0806* | (2022.01) |
| *G06F 11/30* | (2006.01) |
| *H04L 47/76* | (2022.01) |
| *H04L 41/5006* | (2022.01) |

(52) U.S. Cl.
CPC ........ *G06F 9/5077* (2013.01); *G06F 11/3006* (2013.01); *H04L 41/0806* (2013.01); *H04L 41/0893* (2013.01); *H04L 41/5077* (2013.01); *H04L 47/76* (2013.01); *H04L 47/829* (2013.01); *G06F 2209/5022* (2013.01); *H04L 41/5006* (2013.01)

(56) References Cited

U.S. PATENT DOCUMENTS

| | | | |
|---|---|---|---|
| 7,783,666 B1 | 8/2010 | Zhuge | |
| 8,001,122 B2 | 8/2011 | Green | |
| 8,046,378 B1 | 10/2011 | Zhuge | |
| 8,424,059 B2 | 4/2013 | Kwok | |
| 8,429,630 B2 | 4/2013 | Nickolov | |
| 8,612,395 B2 | 12/2013 | Saika | |
| 8,924,361 B2 | 12/2014 | Rehman | |
| 8,935,770 B2 | 1/2015 | Matsugashita | |
| 8,938,775 B1* | 1/2015 | Roth | G06F 21/606 726/1 |
| 9,058,198 B2 | 6/2015 | Mcgrath | |
| 9,112,777 B1 | 8/2015 | Barclay et al. | |
| 9,128,745 B2 | 9/2015 | Crudele | |
| 9,268,584 B2 | 2/2016 | Atchison et al. | |
| 9,294,507 B1 | 3/2016 | Roth | |
| 9,418,121 B2 | 8/2016 | Moxley | |
| 9,519,595 B1 | 12/2016 | Zeldin | |
| 9,531,607 B1 | 12/2016 | Pai | |
| 9,819,626 B1 | 11/2017 | Berg | |
| 9,990,232 B2 | 6/2018 | Chen | |
| 9,990,258 B2 | 6/2018 | Sagiyama | |
| 10,089,476 B1 | 10/2018 | Roth et al. | |
| 10,089,676 B1 | 10/2018 | Gupta | |
| 10,110,506 B2 | 10/2018 | Kasso et al. | |
| 10,127,059 B2 | 11/2018 | Astete | |
| 10,178,042 B2 | 1/2019 | Zhang | |
| 10,225,158 B1 | 3/2019 | Lu | |
| 10,242,370 B2 | 3/2019 | Meek | |
| 10,503,558 B2 | 12/2019 | Rastogi | |
| 10,516,667 B1* | 12/2019 | Roth | G06F 21/6218 |
| 10,659,451 B2 | 5/2020 | Kurian | |
| 10,671,420 B2 | 6/2020 | Xia | |
| 10,789,098 B1 | 9/2020 | Lin | |
| 10,819,652 B2 | 10/2020 | Chhabra | |
| 10,931,594 B2 | 2/2021 | Zheng | |
| 10,977,377 B2 | 4/2021 | Roth | |
| 11,003,497 B2 | 5/2021 | Xiao | |
| 11,061,737 B2 | 7/2021 | Dimitrov | |
| 11,146,502 B2* | 10/2021 | Sun | H04L 47/805 |
| 11,252,190 B1 | 2/2022 | Sharif | |
| 2004/0261081 A1 | 12/2004 | Sen | |
| 2006/0117135 A1 | 6/2006 | Thind | |
| 2009/0157645 A1 | 6/2009 | Green | |
| 2009/0288084 A1 | 11/2009 | Astete | |
| 2010/0077449 A1 | 3/2010 | Kwok | |
| 2012/0066179 A1 | 3/2012 | Saika | |
| 2012/0331539 A1 | 12/2012 | Matsugashita | |
| 2013/0074091 A1 | 3/2013 | Xavier | |
| 2013/0103641 A1 | 4/2013 | Rehman | |
| 2014/0007178 A1 | 1/2014 | Gillum et al. | |
| 2014/0189682 A1 | 7/2014 | Crudele | |
| 2014/0280040 A1 | 9/2014 | Moxley | |
| 2014/0282520 A1* | 9/2014 | Sabharwal | G06F 9/45558 718/1 |
| 2014/0282589 A1 | 9/2014 | Kuang | |
| 2014/0282889 A1 | 9/2014 | Ishaya | |
| 2014/0297781 A1 | 10/2014 | Brand | |
| 2014/0359113 A1* | 12/2014 | Krebs | H04L 41/5009 709/224 |
| 2015/0067128 A1 | 3/2015 | Naseh | |
| 2015/0082301 A1* | 3/2015 | Garg | H04L 41/12 718/1 |
| 2015/0089065 A1 | 3/2015 | Kasso et al. | |
| 2015/0120938 A1* | 4/2015 | Mordani | H04L 41/5054 709/226 |
| 2015/0188840 A1 | 7/2015 | Xiao | |
| 2015/0286505 A1 | 10/2015 | Liu | |
| 2015/0370608 A1 | 12/2015 | Dipol | |
| 2015/0372881 A1 | 12/2015 | Bellomo | |
| 2016/0132805 A1 | 5/2016 | Delacourt | |
| 2016/0132808 A1 | 5/2016 | To | |
| 2016/0142323 A1* | 5/2016 | Lehmann | H04L 41/5025 709/226 |
| 2016/0179576 A1 | 6/2016 | Zhou | |
| 2016/0197880 A1 | 7/2016 | Korman et al. | |
| 2016/0205110 A1* | 7/2016 | Roth | G06F 9/455 726/7 |
| 2016/0239391 A1 | 8/2016 | Sagiyama | |
| 2016/0328259 A1 | 11/2016 | Xia | |
| 2017/0070445 A1 | 3/2017 | Zhang | |
| 2017/0097851 A1 | 4/2017 | Chen | |
| 2017/0286916 A1* | 10/2017 | Skiba | B25J 9/1689 |
| 2018/0145923 A1* | 5/2018 | Chen | H04L 47/70 |
| 2019/0028456 A1 | 1/2019 | Kurian | |
| 2019/0034642 A1 | 1/2019 | Roth | |
| 2019/0146848 A1 | 5/2019 | Rastogi | |
| 2019/0207945 A1 | 7/2019 | Yuan et al. | |
| 2020/0007455 A1 | 1/2020 | Chhabra | |
| 2020/0034177 A1* | 1/2020 | Geldart | G06F 9/45558 |
| 2020/0034206 A1 | 1/2020 | Dimitrov | |
| 2020/0044983 A1 | 2/2020 | Zheng | |
| 2020/0159676 A1* | 5/2020 | Durham | G06F 9/321 |
| 2020/0294152 A1* | 9/2020 | Fletcher | G06Q 40/08 |
| 2021/0042165 A1 | 2/2021 | Rushton | |
| 2021/0044505 A1 | 2/2021 | Rushton | |
| 2021/0044540 A1 | 2/2021 | Rushton | |
| 2021/0081409 A1* | 3/2021 | Rath | G06F 11/3409 |
| 2021/0176122 A1* | 6/2021 | Bregman | G06F 9/5077 |
| 2021/0303328 A1* | 9/2021 | Soppin | G06F 9/45558 |
| 2021/0357263 A1* | 11/2021 | Cruanes | G06F 9/5077 |
| 2021/0377814 A1* | 12/2021 | Sillanpaa | H04W 76/10 |

OTHER PUBLICATIONS

Amazon Web Services, AWS General Reference , "AWS service quotas", 1 pages, © 2021, Amazon Web Services, Inc., retrieved from: <https://docs.aws.amazon.com/general/latest/gr/rande-manage.html>.

Amazon Web Services, AWS General Reference , "Tagging AWS resources", 4 pages , © 2021, Amazon Web Services, Inc., retrieved from: <https://docs.aws.amazon.com/general/latest/gr/aws_service_limits.html>.

Amazon Web Services, AWS General Reference , "Managing AWS Regions", 2 pages , © 2021, Amazon Web Services, Inc., retrieved from: <https://docs.aws.amazon.com/general/latest/gr/aws_tagging.html>.

Microsoft, "Azure Arc documentation", © Microsoft 2021, 23 pages, retrieved from: <https://docs.microsoft.com/en-us/azure/azure-arc/>.

Clouddaddy, "Stress-Free AWS Infrastructure Management", 9 pages, Copyright © 2021 Cloud Daddy, Inc. , retrieved from: <https://www.clouddaddy.com/our-solutions/infrastructure-management>.

Openstack, "Nested quotas", Updated: Aug. 23, 2019 18:51, 4 pages, retrieved from: <https://docs.openstack.org/ocata/config-reference/block-storage/nested-quota.html>.

(56) References Cited

OTHER PUBLICATIONS

Raghuram, Sirish "Multi-Region Management (and Multi-Hypervisor Too)", published on Feb. 10, 2016, last updated Jun. 9, 2021, © 2021 Platform9, 12 pages.
International Search Report and the Written Opinion of the International Searching Authority dated Nov. 4, 2020 for PCT Application No. PCT/2020/045515, 18 pages.
Neto, Andre Correa; "Oracle Cloud Infrastructure Compartments", A-Team Chronicles, published May 9, 2019, retrieved from https://www.ateam-oracle.com/oracle-cloud-infrastructure-compartments, 10 pages.
"OCI-CLI—oci limits—Readme", retrieved from https://raw.githubusercontent.com/oracle/oci-cli/v2.5.19/services/limits/docs/inline-help/limits.txt on Oct. 20, 2020, 7 pages.
Oracle Cloud Infrastructure Documentation, "Compartment Quotas", retrieved from https://docs.cloud.oracle.com/en-us/iaas/Content/General/Concepts/resourcequotas.htm on Oct. 20, 2020, 19 pages.
Oracle Cloud Infrastructure Documentation: Release Notes, "Compartment Quotas", retrieved from https://docs.cloud.oracle.com/en-us/iaas/releasenotes/changes/fc527066-631d-428d-980e-fd7f576fc5c8/ on Oct. 20, 2020, 2 pages.
Oracle / oci-cli, "Release 2.5.19", retrieved from https://github.com/oracle/oci-cli/releases/tag/v2.5.19 on Oct. 20, 2020, 2 pages.
European Patent Office, Communication pursuant to Rules 161(1) and 162 EPC dated Mar. 16, 2022 for European Patent Application No. 20761669.9, 3 pages.
Google Cloud, "Rate-limiting strategies and techniques", retrieved from https://cloud.google.com/solutions/rate-limiting-strategies-techniques on Dec. 20, 2019, 12 pages.
Microsoft Docs, "Azure subscription and service limits, quotas, and constraints", published Nov. 18, 2019, retrieved from https://docs.microsoft.com/en-us/azure/azure-subscription-service-limits, 96 pages.
Openshift, "Quotas and Limit Ranges", Developer Guide, retrieved from https://docs.openshift.com/container-platform/3.11/dev_guide/compute_resources.html on Dec. 20, 2019, 16 pages.
Openstack, "Unified Limits", retrieved from https://docs.openstack.org/keystone/latest/admin/unified-limits.html on Dec. 20, 2019, 8 pages.
"Nested quotas", OpenStack Docs, retrieved from https://docs.openstack.org/mitaka/config-reference/block-storage/nested-quota.html on Jun. 4, 2021, 4 pages.
"Oracle / oci-cli", retrieved from https://github.com/oracle/oci-cli/blob/v2 5.19/services/limits/docs/inline-help/limits.txt on Oct. 22, 2020, 5 pages.
Oracle®, Oracle Cloud Infrastructure Documentation, "Compartment Quotas", Jul. 2019, Copyright© 2022, 39 pages.
United States Patent and Trademark Office, Office Communication dated Nov. 25, 2022 for U.S. Appl. No. 16986163, 17 pages.
United States Patent and Trademark Office, Office Communication dated Jul. 18, 2022 for U.S. Appl. No. 16/986,158, 18 pages.
United States Patent and Trademark Office, Office Communication dated Mar. 8, 2022 for U.S. Appl. No. 16/986,158, 19 pages.
United States Patent and Trademark Office, Notice of Allowance and Fee(s) Due dated Sep. 22, 2022 for U.S. Appl. No. 16/986,160, 20 pages.
United States Patent and Trademark Office, Office Communication dated Apr. 4, 2022 for U.S. Appl. No. 16/986,163, 12 pages.
United States Patent and Trademark Office, Office Communication dated Oct. 28, 2021 for U.S. Appl. No. 16/986,163, 12 pages.
United States Patent and Trademark Office, Notice of Allowance and Fee(s) Due dated Jul. 28, 2022 for U.S. Appl. No. 16/986,164, 9 pages.
United States Patent and Trademark Office, Office Communication dated Apr. 30, 2021 for U.S. Appl. No. 16/986,164, 22 pages.

* cited by examiner

SYSTEM AND METHOD FOR COMPARTMENT QUOTAS IN A CLOUD INFRASTRUCTURE ENVIRONMENT

CLAIM OF PRIORITY AND CROSS REFERENCE TO RELATED APPLICATIONS

This application claims the benefit of priority to U.S. Provisional Patent Application titled "SYSTEM AND METHOD FOR COMPARTMENT QUOTAS IN A CLOUD INFRASTRUCTURE ENVIRONMENT", application Ser. No. 62/884,936, filed Aug. 9, 2019; U.S. Provisional Patent Application titled "SYSTEM AND METHOD FOR SUPPORTING A QUOTA POLICY LANGUAGE IN A CLOUD INFRASTRUCTURE ENVIRONMENT", application Ser. No. 62/884,994, filed Aug. 9, 2019; and U.S. Provisional Patent Application titled "SYSTEM AND METHOD FOR SUPPORTING A USAGE CALCULATION PROCESS IN A CLOUD INFRASTRUCTURE ENVIRONMENT", application Ser. No. 62/884,998, filed Aug. 9, 2019; and is related to pending U.S. Patent Application titled "SYSTEM AND METHOD FOR SUPPORTING A QUOTA POLICY LANGUAGE IN A CLOUD INFRASTRUCTURE ENVIRONMENT", application Ser. No. 16/986,163, filed Aug. 5, 2020; and subsequently published as U.S. Patent Application No. 20210042165 on Feb. 11, 2021; and U.S. Patent Application titled "SYSTEM AND METHOD FOR SUPPORTING A USAGE CALCULATION PROCESS IN A CLOUD INFRASTRUCTURE ENVIRONMENT", application Ser. No. 16/986,164, filed Aug. 5, 2020 and subsequently published as U.S. Patent Application Publication No. 20210044505 on Feb. 11,2021; each of which applications is herein incorporated by reference.

TECHNICAL FIELD

Embodiments described herein are generally related to cloud infrastructure environments, such as Infrastructure as a Service (IaaS), and are particularly related to systems and methods for providing systems and methods for providing resource constraints within such cloud infrastructure environments.

BACKGROUND

Cloud infrastructure environments can comprise sets of complementary cloud services that enable users and clients (throughout the specification, the terms "clients" and "customers" can be used interchangeably) to build and run a wide range of applications and services in a highly available hosted environment.

Year to year, more and more businesses and organizations are migrating mission critical applications and systems to a cloud infrastructure environment. There are various reasons for this shift. For example, many businesses are moving to the cloud in order to reduce the cost and complexity of operating, maintaining, and building out on-premise infrastructure. As well, cloud infrastructure also allows for a more rapid information technology (IT) delivery mechanism. Some businesses and organizations additionally see the cloud infrastructure environment as a means to gain a leg up on competition by adapting to a nimbler system.

Within IaaS (Infrastructure as a Service) models, a cloud provider can provide, host, and manage infrastructure components that would, in traditionally settings, be on-premise at each customer's/client's location. Such traditionally on-premise components can include hardware, for example, data warehouses and data centers, servers, storage, networking hardware, as well as software, such as virtualization software.

IaaS providers can, in addition to providing hardware and software that would traditionally be on-premise, also provide services to their clients and customers. As an example, clients and customers can be allowed to tailor their IaaS subscription to fit their needs, which then in turn allows for detailed and broken-down billing and invoicing. IaaS can also support features such as load balancing, redundancy, replication and recover. Because such services are offered and supported by the IaaS provider (and not the customer), this leaves clients and customers to be more focused on improving their business by pushing more into automation and orchestration for their services.

Cloud infrastructures enable users and clients to seamlessly run traditional enterprise applications along with cloud-native apps, all on the same platform, reducing operational overhead and enabling direct connectivity between both types of workloads.

SUMMARY

In accordance with an embodiment, described herein are systems and methods for providing compartment quotas for a cloud infrastructure environment. In accordance with an embodiment, cloud administrators do not generally have the ability to restrict resource usage in existing clouds. Granting a user permission to create resources allows them to create any number of resources up to a predefined account limit. Compartment quotas allow admins to restrict a user's resource usage to the appropriate level allowing fine-tuned cost control.

In accordance with an embodiment, customers can be assigned service level limits defined by the cloud infrastructure environment at account creation time. These service level limits restrict the total number of resources a customer can create across the entire tenancy (e.g., across multiple regions with multiple compartments). Tenancy and compartment administrators can utilize compartment quotas to set resource-specific limits. Without such compartment limits, a user that is authorized to launch instances can consume all available capacity in the entire tenancy. Compartment resource limits solve this problem and, unlike service limits, are set and customized by the clients and customers via, e.g., a console, SDK, or API. Compartment limits can be applied on top of the service limits and inherited through the nested compartment hierarchy. This allows compartment administrators to limit resource consumption and set boundaries around acceptable resource use.

In accordance with an embodiment, described herein are systems and methods for supporting a quota policy language in a cloud infrastructure environment. A quota policy can be configured by setting a statement syntax. In order to set a quota, the quota can establish a number of factors. Each quota can be unique within a service family (e.g. compute), and as such, each quota can define a target service along with a quota name. Next, a quota can define the value to set the quota to, as well as a compartment the quota targets. There can be a set of conditions that can be included determine when the quota is applied.

In accordance with an embodiment, described herein are systems and methods for supporting a usage calculation process or algorithm in a cloud infrastructure environment. The usage calculation process can be used to determine whether a requested transaction that targets a compartment within a tree-structure of compartments violates any compartment quota or limit within parent compartments within the tree-structure.

DETAILED DESCRIPTION

As described above, cloud infrastructure environments can comprise sets of complementary cloud services that enable users and clients to build and run a wide range of applications and services in a highly available hosted environment.

Figure 1:
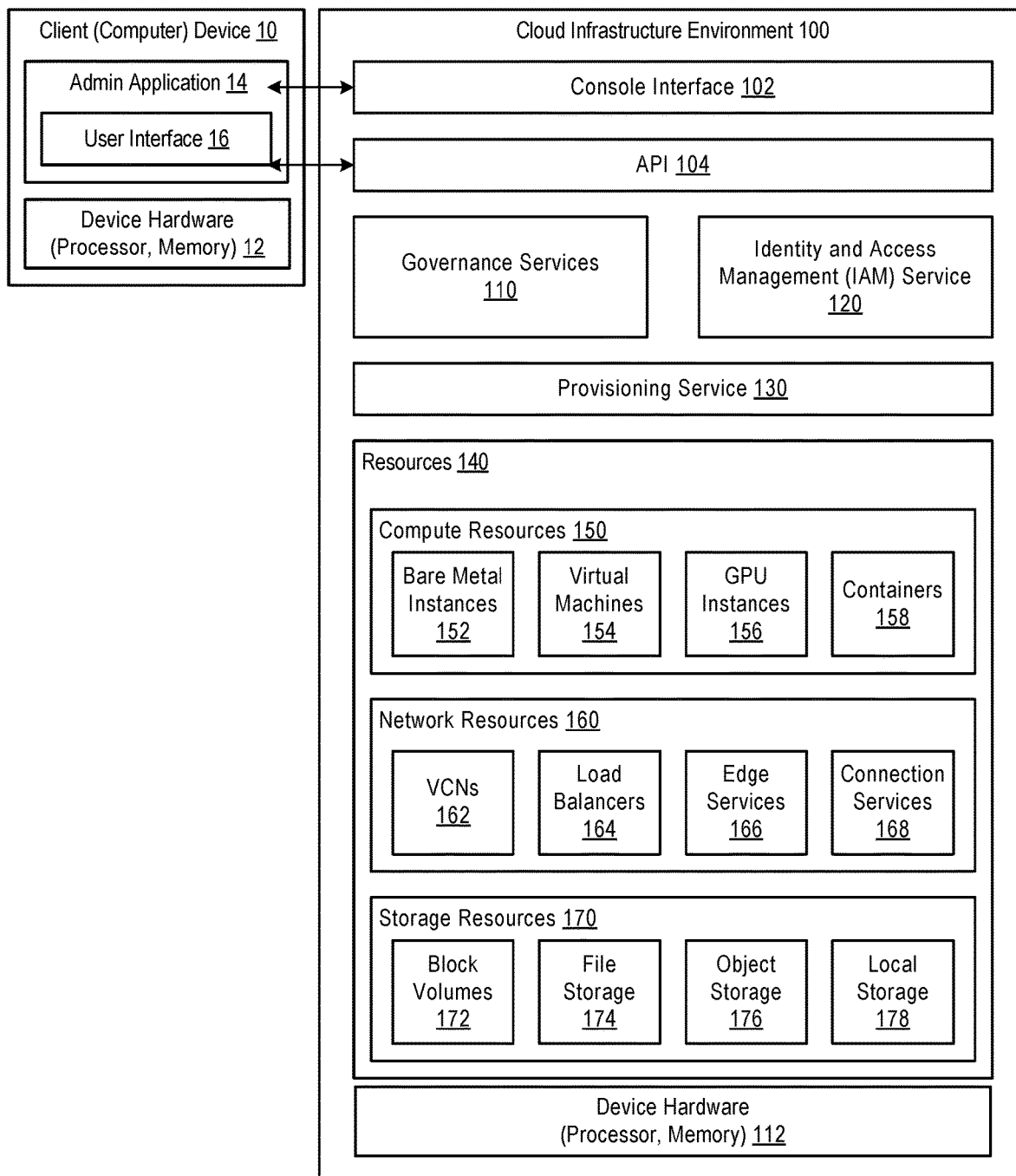
FIG. 1 illustrates a system for providing a cloud infrastructure environment, in accordance with an embodiment.

FIG. 1 shows a system for providing a cloud infrastructure environment, in accordance with an embodiment.

In accordance with an embodiment, a cloud infrastructure environment 100, which can be run on a number of hardware and software resources 112, can comprise a console interface 102 and an API 104. In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170.

In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an administrator application 14, which can comprise a user interface 16.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the could infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons. Defined tags can be controlled to avoid incorrect tags from being applied to resources. Tags can also provide a flexible targeting mechanism for administrative scripts. As well, the governance services can allow for managed budgets, and track actual and forecasted spend all from one place. This allows clients to stay on top of usage with a cost analysis dashboard, and filter by compartments and tags to analyze spending by departments, teams, and projects. Such data can as well be exported for detailed resource utilization reporting and integration with an existing cloud management and business intelligence tools. The governance services can also log events that can later be retrieved, stored, and analyzed for security, compliance, and resource optimization across the loud infrastructure entitlements and compartments.

In accordance with an embodiment, the identity and access management (IAM) service 120 can create a user profile for each client/customer/user in the IAM service with associated with user credential (e.g., username and password). Clients can be granted administrator privileges in the cloud infrastructure as well via the IAM service.

In accordance with an embodiment, the identity and access management service can be integrated with the cloud infrastructure environment. Upon a client registering. The IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controller through, for example, the console interface or via one or more APIs, such as API 104. The provisioning service can allow for lets clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by an cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, edge services 156, and containers 158. The compute resources layer can be used to, for example, provision and manage bare metal compute instances, provision instances as needed to deploy and run applications, just as in an on-premises data center.

In accordance with an embodiment, the cloud infrastructure environment can provide control of one or more physical host ("bare metal") machines within the compute resources layer. Bare metal compute instances run directly on bare metal servers without a hypervisor. When ca bare metal compute instance is provisioned, the client can maintain sole control of the physical CPU, memory, and network interface card (NIC). The bare metal compute instance can be configured and utilize the full capabilities of each physical machine as if it were hardware running in an on-premise own data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operation system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial HPC applications. GPU compute instances can be provisioned as either virtualized compute instances (where multiple GPU compute instances share the same bare metal hardware), or as bare metal instances which provide dedicate hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168.

In accordance with an embodiment, the cloud infrastructure environment can provide a number of virtual cloud networks 162 at the networking resources layer. A virtual cloud network can comprise a virtual version of a traditional network—including subnets, route tables, and gateways—on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balances can provide a public or private IP address, and provisioned bandwidth.

In accordance with an embodiment, a load balancer can improve resource utilization, scaling, and help ensure high availability. Multipole load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance transport different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balance can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can create a primary load balancer and a standby load balancer, each in a different availability domain, to ensure accessibility even during an availability domain outage. If a load balance is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balances can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid state drives for I/O intensive applications. These can be provided, for example, within bare metal instances. Local storage provides high storage performance for VM's and bare metal compute instances. Some examples include relational databases, data warehousing, big data, analytics, AI and HPC application.

Figure 2:
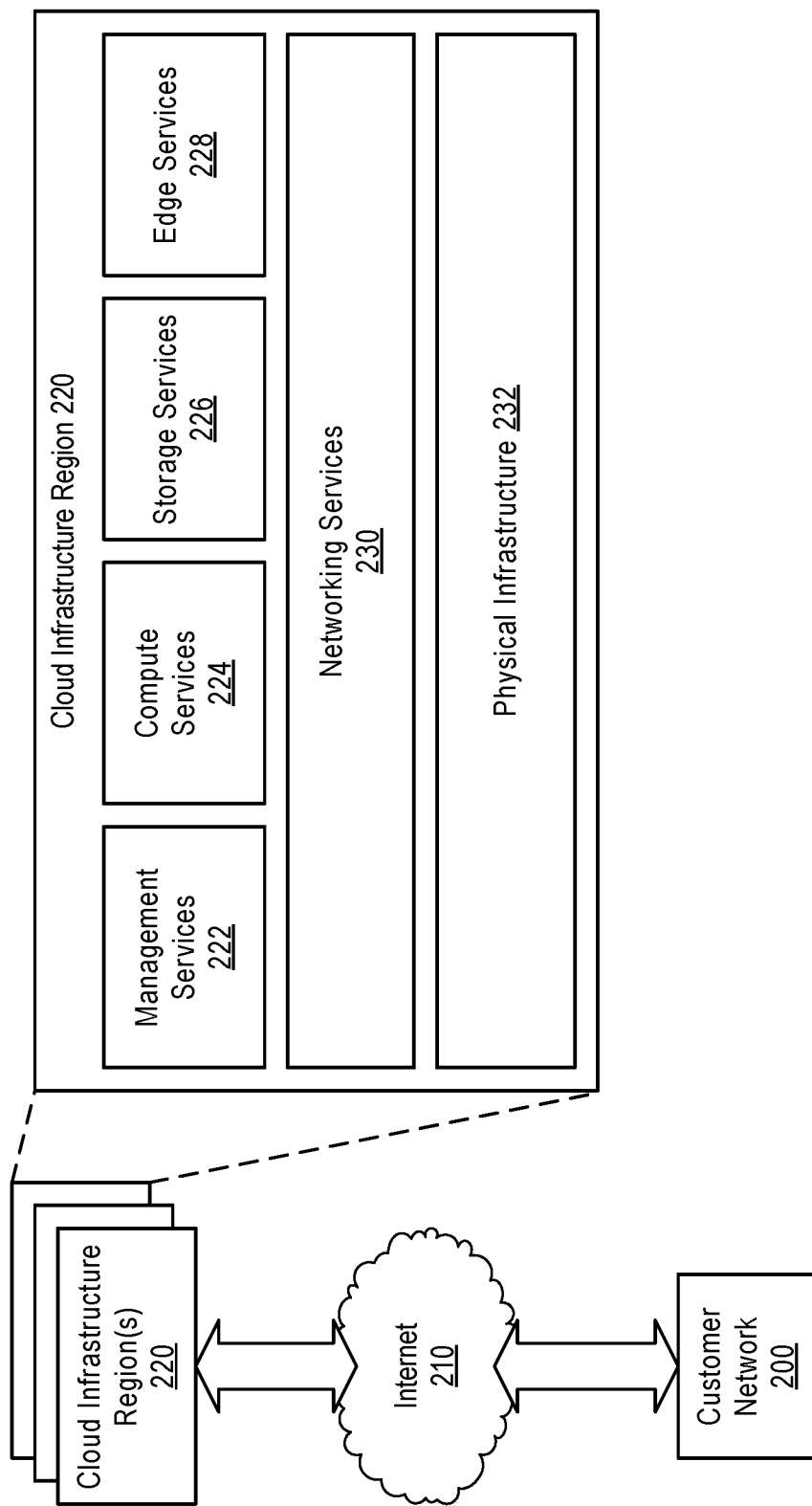
FIG. 2 illustrates a system for providing cloud infrastructure regions within a cloud infrastructure environment, in accordance with an embodiment.

FIG. 2 illustrates a system for providing cloud infrastructure regions within a cloud infrastructure environment, in accordance with an embodiment.

In accordance with an embodiment, instances of the cloud infrastructure environment described above in FIG. 1 can be hosted in different regions, called cloud infrastructure regions 220. These can be accessed, as described above, via a console, SDK, or APIs, by customer networks 200 via a network, such as the internet 210. Each cloud infrastructure region can comprise management services 222, compute services 224, storage services 226, edge serves 228, network services 230, and physical infrastructure 232.

In accordance with an embodiment, a cloud infrastructure can be hosted in regions and availability domains. A region can be a localized geographic area, and an availability domain can be one or more data centers located within a region. A region is composed of one or more availability domains. Most cloud infrastructure resources can be either region-specific, such as a virtual cloud network, or availability domain-specific, such as a compute instance. Traffic between availability domains and between regions is encrypted.

In accordance with an embodiment, availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

In accordance with an embodiment, availability domains within the same region can be connected to each other by a low latency, high bandwidth network, which can provide high-availability connectivity to the internet and on-premises, and to build replicated systems in multiple availability domains for both high-availability and disaster recovery.

In accordance with an embodiment, regions are independent of other regions and can be separated geographically (e.g., across countries or continents). This then leads to the deployment of an application within a region where the application would most likely be utilized the most frequently.

In accordance with an embodiment, however, applications can also be deployed in different regions for various reasons. This can include, for example, risk mitigation when events, such as weather systems, take a region offline. In addition, applications can be deployed in other regions for strategic reasons, such as tax domains or other business or social criteria.

In accordance with an embodiment, there are several services that are available across regions. These include, for example, management services 222, compute services 224, storage services 226, edge services 228, and network services 230.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container. When working within a console, a compartment can act as a filter for what is allowed to be viewed.

In accordance with an embodiment, compartments can have several layers. For example, a tenancy can be considered a root compartment that holds all of a client's cloud resources. Additional compartments can be created within that root compartment (tenancy) and corresponding policies to control access to the resources in each compartment. When clients create a cloud resource such as an instance, block volume, or cloud network, such a resource can be directed to a specific compartment or compartments. Compartments can span regions.

Fault Domains

In accordance with an embodiment, a fault domain can comprise a grouping of hardware and infrastructure within an availability domain. Each availability domain can comprise three fault domains. Fault domains allow instances to be distributed so that they are not on the same physical hardware within a single availability domain. A hardware failure or Compute hardware maintenance that affects one fault domain does not affect instances in other fault domains.

In accordance with an embodiment, placement of resources, such as compute, bare metal DB system, or virtual machine DB system instances, can optionally specify a fault domain or a new instance at launch time. The resources can additionally change fault domains after placement by terminating the resource at the current fault domain and launching a new instance of the resource at another fault domain.

In accordance with an embodiment, fault domains can be utilized for a number of reasons, such as protecting against unexpected hardware failures and protecting against planned outages due to maintenance.

Availability

In accordance with an embodiment, service availability can be provided. Regions within cloud infrastructure environments can provide core infrastructure services and resources, including the following:

Compute: Compute (Bare Metal & V M, DenseIO & Standard), Container Engine for Kubernetes, Registry Storage: Block Volume, File Storage, Object Storage, Archive Storage Networking: Virtual Cloud Network, Load Balancing, FastConnect Database: Database, Exadata Cloud Service, Autonomous Data Warehouse, Autonomous Transaction Processing Edge: DNS Platform: Identity and Access Management, Tagging, Audit In accordance with an embodiment, the above services and resources can be generally available, while other services and resources can additionally be available as well (e.g., based upon regional demand or customer request). As an example, new cloud services can be made available in regions as quickly based on a variety of considerations including regional customer demand, ability to achieve regulatory compliance where applicable, resource availability, and other factors. Because of low latency interconnect backbone, customers can use cloud services in other geographic regions with effective results when they are not available in their home region, provided that data residency requirements do not prevent them from doing so.

In accordance with an embodiment, resource availability can be considered in the context of global availability, regional availability, single region availability, and domain availability. Generally speaking, IAM resources are globally available, DB systems, instances, and volumes are specific to a viability domain. Most other resources are regional.

In accordance with an embodiment, examples of globally available resources can include API signing keys, compartments, dynamic groups, federation resources, groups, policies, tag namespaces, tag keys, and users.

In accordance with an embodiment, examples of regionally available resources can include, alarms, applications, buckets (although buckets are regional resources, they can be accessed from any location when the correct region-specific Object Storage URL for the API calls is used), clusters, cloudevents-rules, customer-premises equipment (CPE), DHCP options sets, dynamic routing gateways (DRGs), encryption keys, functions, images, internet gateways, jobs, key vaults, load balancers, local peering gateways (LPGs), metrics, NAT gateways, network security groups, node pools, ons-subscriptions, ons-topics, repositories, reserved public Ips, route tables, security lists, service gateways, stacks, subnets (when a subnet is created, it can be declared to be a regional or specific to an availability domain), virtual cloud networks (VCNs), and volume backups (volume backups can be restored as new volumes to any availability domain within the same region in which they are stored).

In accordance with an embodiment, examples of availability domain-specific resources can include DB Systems, ephemeral public Ips, instances (instances can be attached to volumes in the same availability domain), subnets (when a subnet is created, it can be declared to be a regional or specific to an availability domain), and volumes (volumes can be attached to an instance in a same availability domain).

Compartments

In accordance with an embodiment, administrators can manage compartments within a cloud infrastructure environment.

In accordance with an embodiment, tags can be applied to resources within a compartment. Tags can be used to, for example, organize resources according a schema, such as a business needs schema. Tags can be applied to resources at the time of creation of a resource, or a tag can be updated on an existing resource.

In accordance with an embodiment, compartments are important to the construction and organization of a cloud infrastructure. Resources can be moved between compartments, and resources can be displayed (e.g., via a user interface) organized by compartment within a current region. When working with and managing resources, a compartment can first be selected.

In accordance with an embodiment, compartments are tenancy-wide, and can span across regions. When a compartment is created, the compartment can be made available within every region that a tenancy is subscribed to.

In accordance with an embodiment, compartments can be deleted. In order for a compartment to be deleted, the compartment can have all resources therein removed prior to deletion.

In accordance with an embodiment, the action to delete a compartment can be asynchronous and initiates a work request. The state of the compartment changes to "Deleting" while the work request is executing. If the work request fails, the compartment is not deleted and it returns to the active state.

In accordance with an embodiment, each compartment created within the cloud infrastructure environment can have certain properties. For example, each compartment can be assigned a unique identifier (ID), and can additionally, and optionally, be provided with a modifiable description, as well as a name. In accordance with an embodiment, sub-compartments (or subcompartments) can be defined in a hierarchical manner under a base compartment.

In accordance with an embodiment, access and control over compartments and subcompartments can be limited to administrators or other users with sufficient credentials. Credentials can be associated with differing levels of compartment access. For example, an administrator can have permission to view and access all compartments and work with resources within any compartment of a tenancy, but a user with more limited access will not have such a level of access and control.

Figure 3:
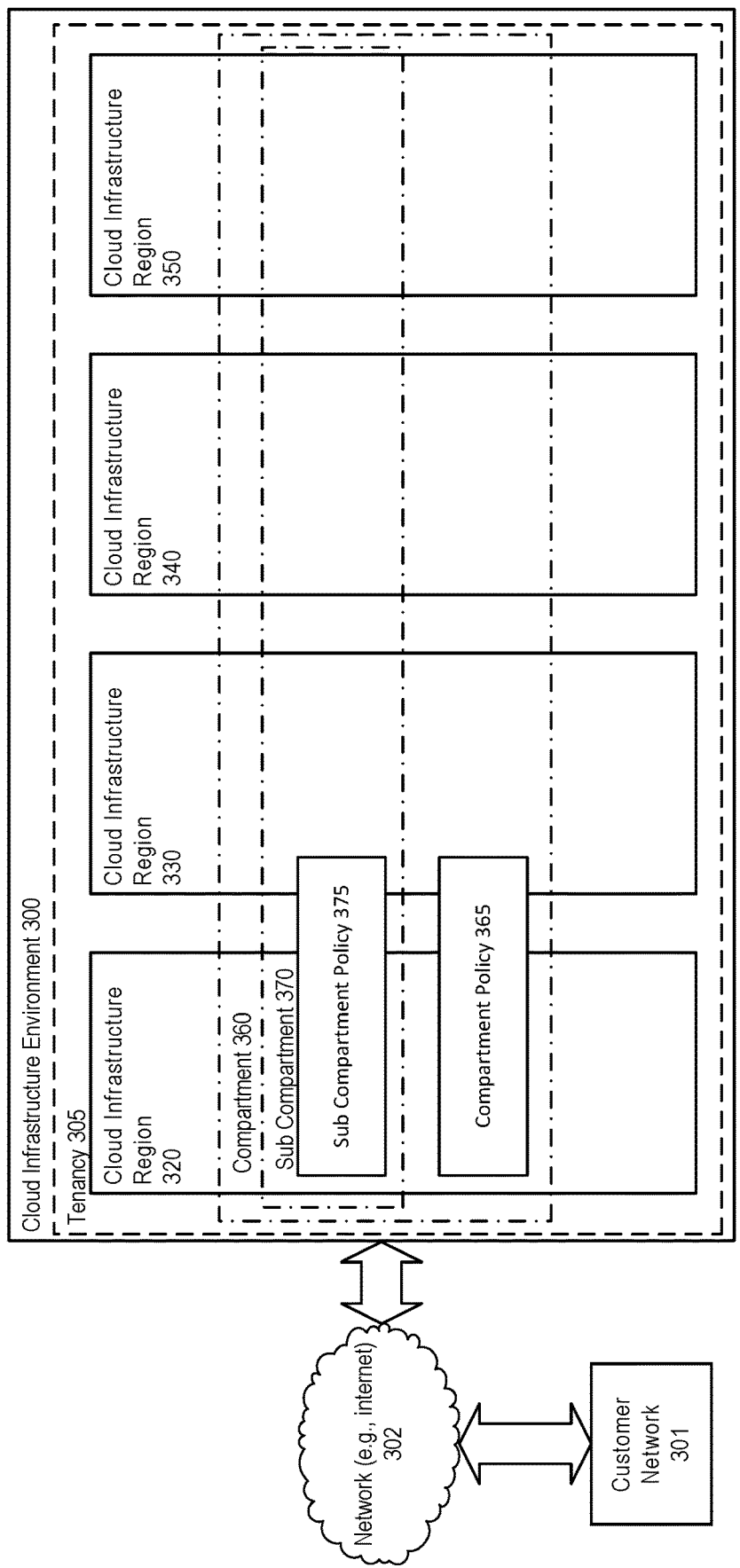
FIG. 3 illustrates a system for providing compartment policies within compartments spanning cloud infrastructure regions within a cloud infrastructure environment, in accordance with an embodiment.

FIG. 3 illustrates a system for providing compartment policies within compartments spanning cloud infrastructure regions within a cloud infrastructure environment, in accordance with an embodiment.

In accordance with an embodiment, as described above, instances of the cloud infrastructure environment 300 described above in FIG. 1 can be hosted in different regions, such as cloud infrastructure regions 320, 330, 340, 350. These can be accessed, as described above, via a console, SDK, or APIs, by customer networks 301 via a network 302, such as the internet.

In accordance with an embodiment, a customer network 301 can comprise, for example, a single computer, a network of customer computers, or other such networks.

In accordance with an embodiment, although not shown in the Figure, each cloud infrastructure region can comprise a number of services, each comprising a number of resources, such as management services, compute services, storage services, edge serves, network services, and physical infrastructure.

In accordance with an embodiment, a cloud infrastructure can be hosted in regions and availability domains. A region can be a localized geographic area, and an availability domain can be one or more data centers located within a region. A region is composed of one or more availability domains. Most cloud infrastructure resources can be either region-specific, such as a virtual cloud network, or availability domain-specific, such as a compute instance. Traffic between availability domains and between regions is encrypted.

In accordance with an embodiment, availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

In accordance with an embodiment, availability domains within the same region can be connected to each other by a low latency, high bandwidth network, which can provide high-availability connectivity to the internet and on-premises, and to build replicated systems in multiple availability domains for both high-availability and disaster recovery.

In accordance with an embodiment, regions are independent of other regions and can be separated geographically (e.g., across countries or continents). This then leads to the deployment of an application within a region where the application would most likely be utilized the most frequently.

In accordance with an embodiment, however, applications can also be deployed in different regions for various reasons. This can include, for example, risk mitigation when events, such as weather systems, take a region offline. In addition, applications can be deployed in other regions for strategic reasons, such as tax domains or other business or social criteria.

In accordance with an embodiment, there are several services that are available across regions. These include, for example, management services, compute services, storage services, edge services, and network services.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container.

When working within a console, a compartment can act as a filter for what is allowed to be viewed.

In accordance with an embodiment, compartments can have several layers. For example, a tenancy 305 can be considered a root compartment that holds all of a client's cloud resources. Compartments can be organized in a hierarchical manner, such as compartment 360 being a level below the tenancy compartment, with sub compartment 370 being an additional layer below the compartment 360. In accordance with an embodiment, each compartment can be associated with one or more compartment policies, such as compartment policy 364, and sub compartment policy 375. Tenant compartment policy is not shown in the Figure.

In accordance with an embodiment, during, upon, or after creation of a compartment, or sub compartment, such as compartment 360 and sub compartment 370, a policy, such as compartment policy 365 and sub compartment policy 375 can be written/created for each compartment and sub compartment. Compartment policies can, for example, restrict which users are allowed to access/utilize resources and services within a compartment. Without a policy in place, access to the compartments and/or sub compartments can be restricted to users having permissions at the tenancy 305 level.

In accordance with an embodiment, upon creation of a compartment within a compartment (i.e., a sub compartment), the sub compartment inherits access permissions from compartments higher up its hierarchy.

In accordance with an embodiment, upon creation of a compartment or sub compartment policy, the policy can comprise a specification indicating which compartment the policy attaches to. Such a specification can contain controls limiting access for subsequence control, modification, or deletion of the policy. In some embodiments, the policies can be attached to a tenancy, a parent compartment, or the specific compartment to which the policy is directed.

In accordance with an embodiment, resources can be placed into a compartment. This can be accomplished by specifying the targeted compartment upon creation of a resource (the compartment is one of the required pieces of information to create a resource). This can be accomplished via a console interface.

In accordance with an embodiment, existing resources can also be moved to different compartments. Most resources can be moved after they are created.

In accordance with an embodiment, some resources have attached resource dependencies and some do not. Not all attached dependencies behave the same way when the parent resource moves.

In accordance with an embodiment, for some resources, the attached dependencies move with the parent resource to the new compartment. The parent resource moves immediately, but in some cases attached dependencies move asynchronously and are not visible in the new compartment until the move is complete.

In accordance with an embodiment, for other resources, the attached resource dependencies do not move to the new compartment. Such attached resources can be moved independently.

In accordance with an embodiment, after a resource is moved to a new compartment, the policies that govern the new compartment apply immediately and affect access to the resource. Depending on the structure of the compartment organization, metering, billing, and alarms can also be affected.

In accordance with an embodiment, after creation, a compartment can be moved to, e.g., a different parent compartment within a same tenancy. Upon moving a compartment, all of the compartment's contents (including sub compartments and resources) are moved along with the compartment.

Figure 4:
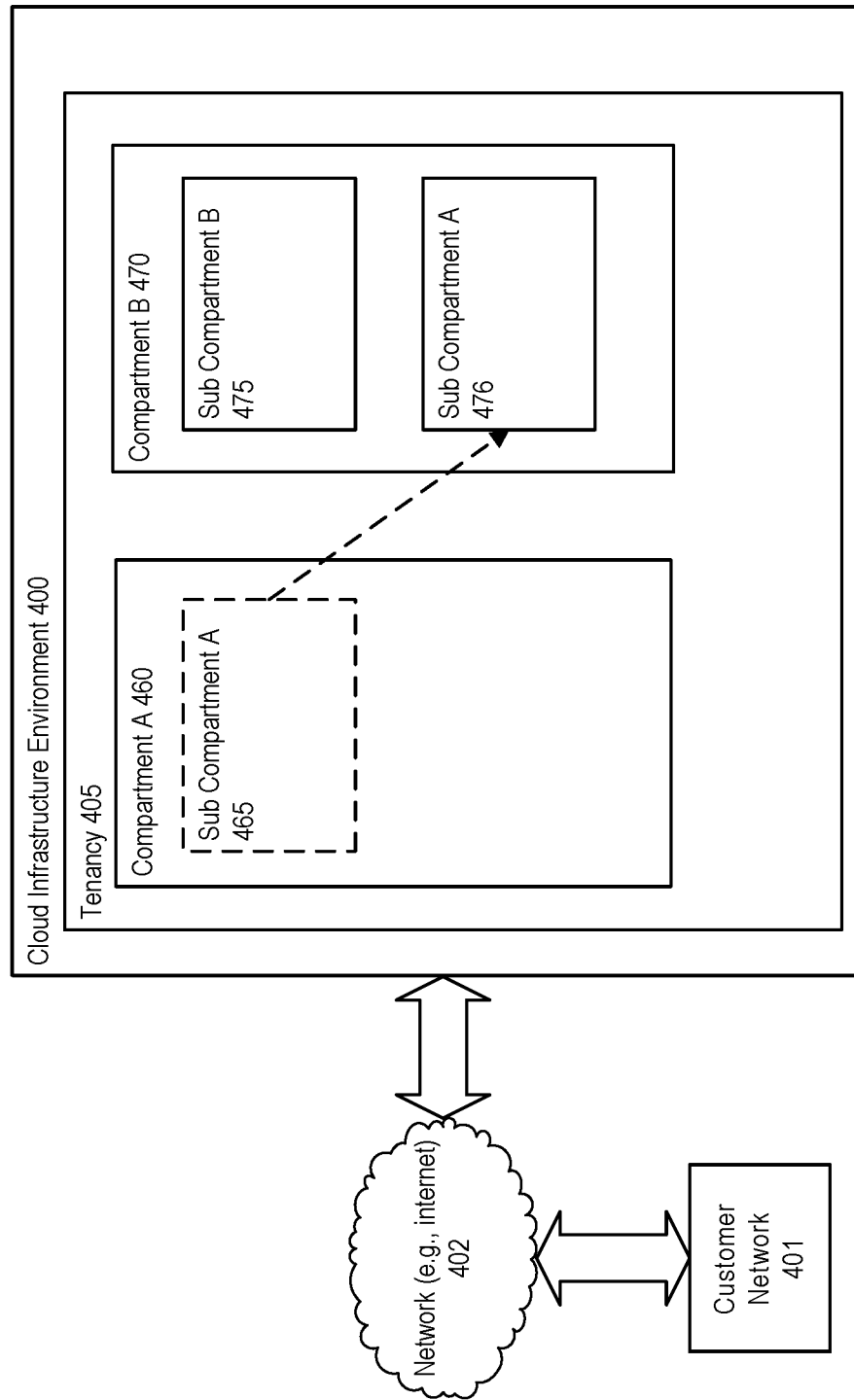
FIG. 4 illustrates a system for compartment migration within a cloud infrastructure environment, in accordance with an embodiment.

FIG. 4 illustrates a system for compartment migration within a cloud infrastructure environment, in accordance with an embodiment.

In accordance with an embodiment, as described above, instances of the cloud infrastructure environment 400 described above in FIG. 1 can be hosted in different regions. Compartments, such as tenancy 405, compartment A 460 and compartment B 470, can be defined within the cloud infrastructure environment, and these compartments can span across regions. Such compartments can be accessed, as described above, via a console, SDK, or APIs, by customer networks 401 via a network 402, such as the internet.

In accordance with an embodiment, a customer network 401 can comprise, for example, a single computer, a network of customer computers, or other such networks.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container. When working within a console, a compartment can act as a filter for what is allowed to be viewed.

In accordance with an embodiment, compartments can have several layers. For example, a tenancy 405 can be considered a root compartment that holds all of a client's cloud resources. Compartments can be organized in a hierarchical manner, such as compartment A 460 and compartment B 470 being a level below the tenancy compartment, with sub compartment A 465 being defined below compartment A, and sub compartment B 475 being defined below compartment B. In accordance with an embodiment, each compartment can be associated with one or more compartment policies (not shown).

In accordance with an embodiment, compartments defined within a tenancy, for example, can be moved by, for example, re-defining a compartment or sub-compartment.

In accordance with an embodiment, in order to move a compartment, a request with sufficient permissions can be received. That is, a request from a user belonging to a group that has, for example, a "manage all-resources" permissions on the lowest shared parent compartment to the current compartment and the destination compartment of the moving compartment.

That is, for example, a request to move sub-compartment A 465 from (move from 465 to 476) compartment A 460 to compartment B 470 must be received from a user with sufficient permissions. Because the tenancy 405 is the lowest shared parent compartment of both the source compartment, compartment A 460, and the destination compartment, compartment B 470, then the request to move sub-compartment A, as shown in the Figure, must be received from a user having "manage all-resources" permissions within the tenancy 405 compartment.

In accordance with an embodiment, in another example, if the request to move sub-compartment A 465 from compartment A to compartment B was received from a user having "manage all-resources" permissions within compartment A only, then the request may fail as the request from the user cannot manage resources within the destination compartment, namely compartment B.

In accordance with an embodiment, upon moving a compartment to a new parent compartment, the access policies of the new parent take effect and the policies of the previous parent compartment no longer apply. In some cases, when moving nested compartments with policies that specify the hierarchy, the policies can be automatically updated to ensure consistency.

In accordance with an embodiment, therefore, a compartment policy of compartment A 460 which was previously applied to sub-compartment A would no longer apply on migration of the sub-compartment A to compartment B. Then, a compartment policy of compartment B would apply to sub-compartment A instead. This is explained more in the description following Figure.

Figure 5:
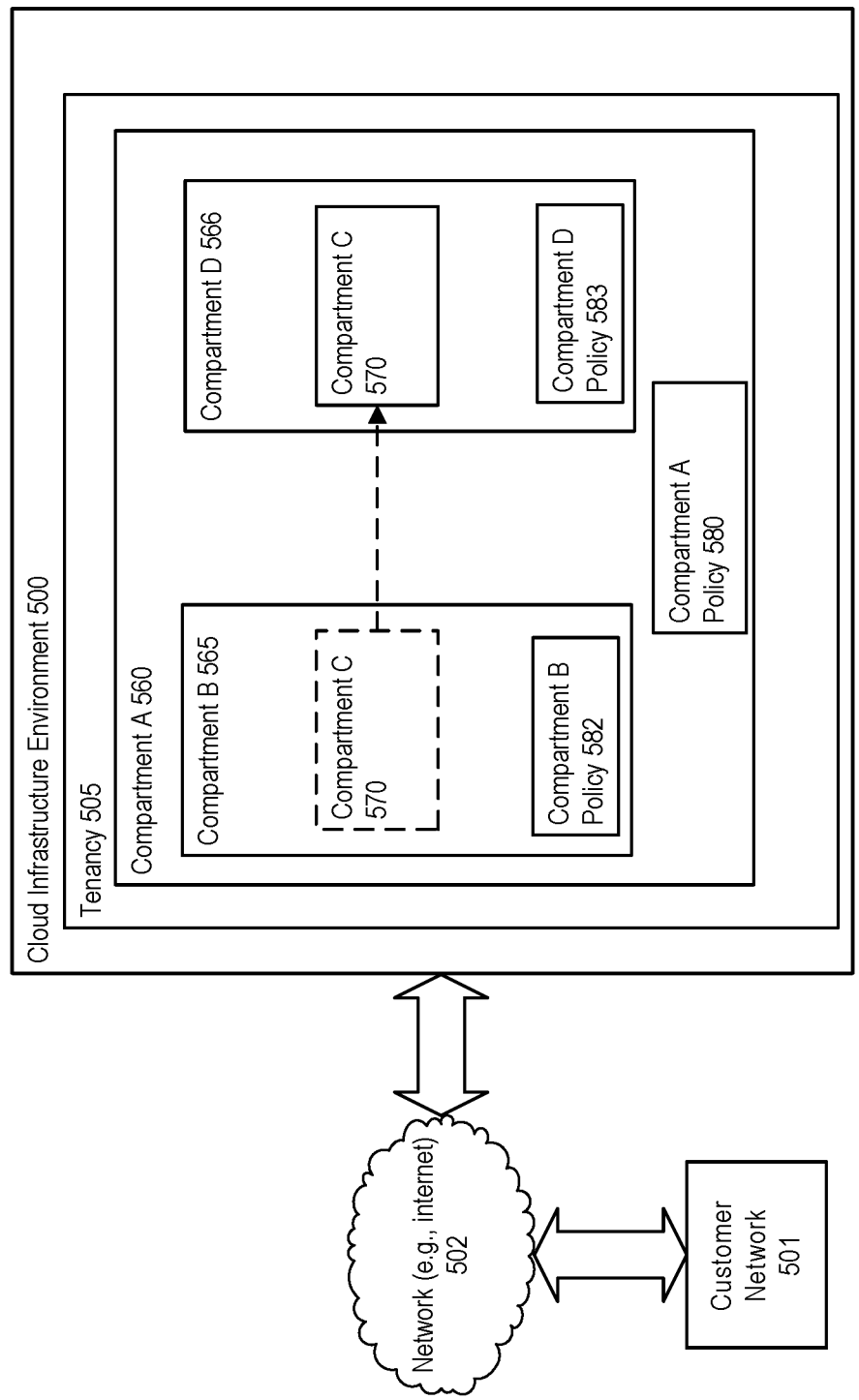
FIG. 5 shows a system for policy management and enforcement during compartment migration within a cloud infrastructure environment.

FIG. 5 shows a system for policy management and enforcement during compartment migration within a cloud infrastructure environment.

In accordance with an embodiment, and more specifically, FIG. 5 shows a compartment hierarchy in which a compartment is moved, and the consequences for different policies.

In accordance with an embodiment, as described above, instances of the cloud infrastructure environment 500 described above in FIG. 1 can be hosted in different regions. Compartments, such as tenancy 505, compartment A 560 and compartment B 565, and compartment D 566 can be defined within the cloud infrastructure environment, and these compartments can span across regions. Such compartments can be accessed, as described above, via a console, SDK, or APIs, by customer networks 501 via a network 502, such as the internet.

In accordance with an embodiment, a customer network 501 can comprise, for example, a single computer, a network of customer computers, or other such networks.

In accordance with an embodiment, compartments can have several layers. For example, a tenancy 505 can be considered a root compartment that holds all of a client's cloud resources. Compartments can be organized in a hierarchical manner, such as compartment A 560 being a level below the tenancy. Compartments B 565 and compartment D 566 are then organized as being yet another level below compartment A 560, while compartment C 570 is shown as being originally a level below compartment B. In accordance with an embodiment, each compartment can be associated with one or more compartment policies, such as compartment B policy 582, compartment A policy 580, and compartment D policy 583. Such policies can govern, for example, user/client permissions for access to the compartments, as well as permissions for access to and control of resources within any given compartment. As described above, compartment policies can add to each other (i.e., "stack"), such that a user accessing compartment B 565 would have their interactions with compartment B 565 being governed by/limited by compartment B policy 582 in addition to compartment A policy 580.

In accordance with an embodiment, for example, suppose that compartment B policy 582 allows a group, group 1, to manage the instance-family in compartment A-B (the compartment hierarchy comprising compartment B being a sub compartment of compartment A).

In accordance with an embodiment, suppose also that compartment D policy 583 allows another group, group 2, to manage the instance family in compartment A-D (the compartment hierarchy comprising compartment D being a sub compartment of compartment A).

In accordance with an embodiment, upon compartment C being moved from compartment B to compartment D, members of group 1 can no longer manage instance families in compartment C, while members of group 2 can now manage instance families in compartment C.

In accordance with an embodiment, in certain situations, upon moving a compartment, certain policies can be automatically updated. Policies, for example, that specify the compartment hierarchy down to the compartment being moved can be automatically be updated when the policy is attached to a shared ancestor of the current and target parent.

Referring back to FIG. 5, for example, in accordance with an embodiment, suppose that compartment A policy allows members of a group, group X, to manage buckets in compartment B:C. On moving compartment C to compartment D, because of the shared ancestor (compartment A) between compartments B and D, then the compartment A policy can be automatically updated to allow members of group X to manage buckets in compartment D:C.

In accordance with an embodiment, polices attached to tenancies can be likewise automatically updated upon a compartment moving within the tenancy.

In accordance with an embodiment, however, not all policies are automatically updated upon a compartment moving. For example, in referring to FIG. 5, in the situation where compartment C is moved from compartment B to compartment D. Suppose that the compartment B policy allows management of buckets in compartment C (prior to moving). When compartment C is moved, then, compartment B policy is not automatically updated. Instead, the policy is no longer valid and can be removed (e.g., manually or automatically).

Compartment Quotas

In accordance with an embodiment, cloud administrators do not generally have the ability to restrict resource usage in existing clouds. Granting a user permission to create resources allows them to create any number of resources up to a predefined account limit. Compartment quotas allow restrictions to be placed on the ability to create or use resources within a compartment to the appropriate level allowing fine-tuned cost control.

In accordance with an embodiment, customers can be assigned service level limits defined by the cloud infrastructure environment at account creation time. These service level limits restrict the total number of resources a customer can create across the entire tenancy (e.g., across multiple regions with multiple compartments). Tenancy and compartment administrators can utilize compartment quotas to set resource-specific hard limits. Without such compartment limits, a user that is authorized to launch instances can consume all available capacity in the entire tenancy. Compartment resource limits solve this problem and, unlike service limits, are set and customized by the clients and customers via, e.g., a console, SDK, or API. Compartment limits can be applied on top of the service limits and inherited through the nested compartment hierarchy. This allows compartment administrators to limit resource consumption and set boundaries around acceptable resource use.

In accordance with an embodiment, compartment quotas give tenant and compartment administrators better control over how resources are consumed in a cloud infrastructure environment, enabling administrators to easily allocate resources to compartments using, for example, a console, SDK, or API. Compartment quotas are a powerful toolset to manage client spending in within tenancies.

Figure 6:
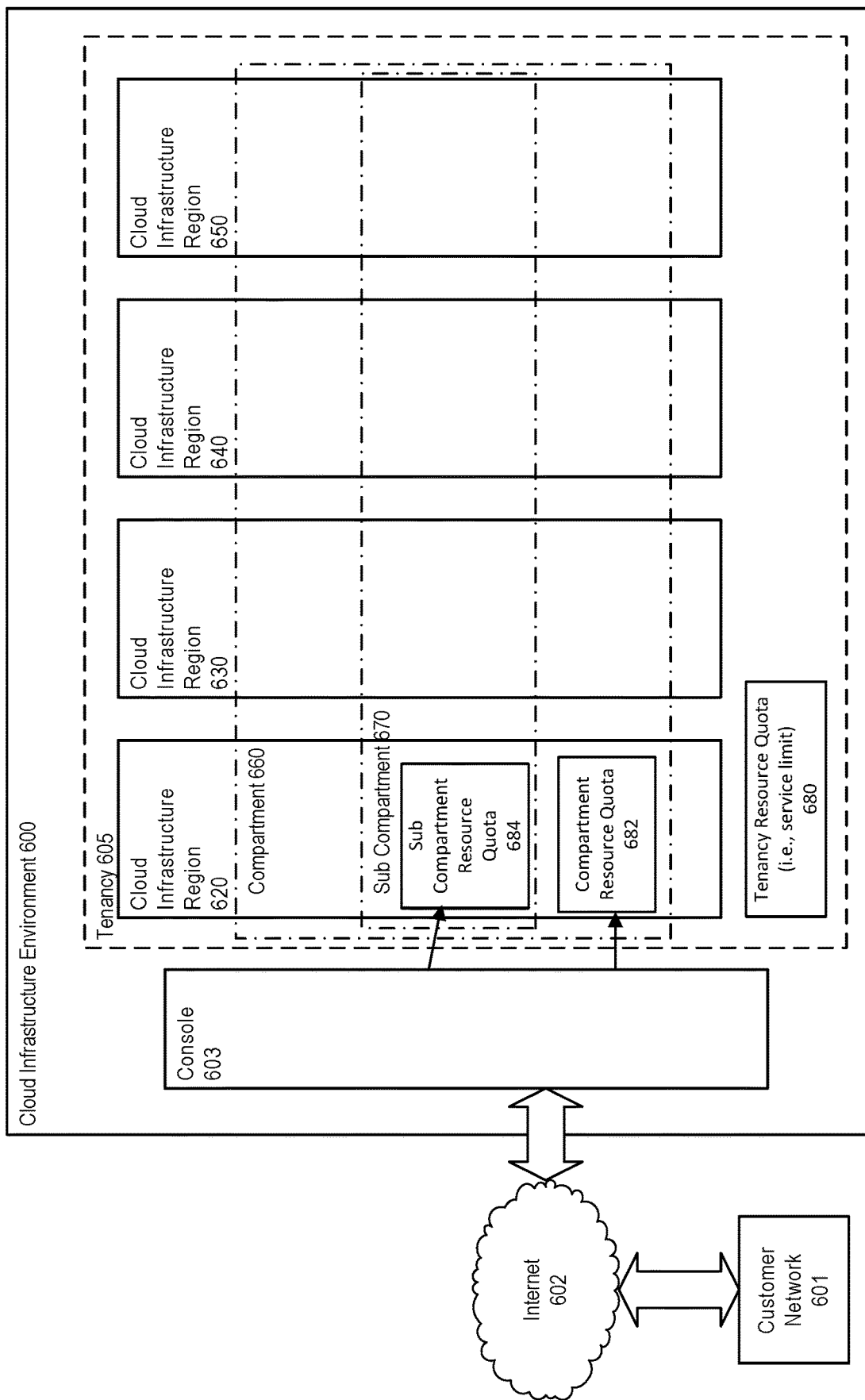
FIG. 6 shows a system for supporting compartment quotas in a cloud infrastructure environment, in accordance with an embodiment.

FIG. 6 shows a system for supporting compartment quotas in a cloud infrastructure environment, in accordance with an embodiment.

In accordance with an embodiment, as described above, instances of the cloud infrastructure environment 600 described above in FIG. 1 can be hosted in different regions, such as cloud infrastructure regions 620, 630, 640, 650. These can be accessed, as described above, via a console 603, SDK, or APIs, by customer networks 601 via a network 602, such as the internet.

In accordance with an embodiment, a customer network 601 can comprise, for example, a single computer, a network of customer computers, or other such networks.

In accordance with an embodiment, although not shown in the Figure, each cloud infrastructure region can comprise a number of services, each comprising a number of resources, such as management services, compute services, storage services, edge serves, network services, and physical infrastructure.

In accordance with an embodiment, a cloud infrastructure can be hosted in regions and availability domains. A region can be a localized geographic area, and an availability domain can be one or more data centers located within a region. A region is composed of one or more availability domains. Most cloud infrastructure resources can be either region-specific, such as a virtual cloud network, or availability domain-specific, such as a compute instance. Traffic between availability domains and between regions is encrypted.

In accordance with an embodiment, availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

In accordance with an embodiment, availability domains within the same region can be connected to each other by a low latency, high bandwidth network, which can provide high-availability connectivity to the internet and on-premises, and to build replicated systems in multiple availability domains for both high-availability and disaster recovery.

In accordance with an embodiment, regions are independent of other regions and can be separated geographically (e.g., across countries or continents). This then leads to the deployment of an application within a region where the application would most likely be utilized the most frequently.

In accordance with an embodiment, however, applications can also be deployed in different regions for various reasons. This can include, for example, risk mitigation when events, such as weather systems, take a region offline. In addition, applications can be deployed in other regions for strategic reasons, such as tax domains or other business or social criteria.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container. When working within a console, a compartment can act as a filter for what is allowed to be viewed.

In accordance with an embodiment, compartments can have several layers, or levels, arranged in a hierarchical manner. For example, a tenancy 605 can be considered a root compartment that holds all of a client's cloud resources. Compartments can be organized in a hierarchical manner, such as compartment 660 being a level below the tenancy compartment, with sub compartment 670 being an additional layer below the compartment 660. In accordance with an embodiment, each compartment can be associated with one or more compartment resource quotas, such as tenancy resource quota 680 (i.e., the service limit discussed above), compartment resource quota 682, and sub compartment resource quota 684.

In accordance with an embodiment, during, upon, or after creation of a compartment, or sub compartment, such as compartment 660 and sub compartment 670, each corresponding compartment resource quota can be generated via, e.g., the console 603.

In accordance with an embodiment, because of the hierarchical nature of compartments, a compartment resource quota set can be set on a root/base level compartment. An administrator (having a level of access sufficient to manage and create resource quotas within the root compartment) can set quotas on the root compartment, as well as any nested or "child" compartments. Compartment resource quotas set on a parent/root compartment override any compartment resource quotas set on child compartments. In this way, an administrator of a parent compartment can create a quota on a child compartment that cannot be overridden by the child.

In accordance with an embodiment, quotas can have different scopes, and work at the availability domain, the region, or globally. There are a few important things to understand about scope when working with compartment quotas. When setting a quota at the availability domain (AD) level, the quota is allocated to each AD. So, for example, setting a quota of 2×7 VMs on a compartment actually sets a limit of 2 VMs per AD. Quotas can be written in such a way to target a specific AD. Likewise, regional quotas can apply to each region. For example, if a quota of 10 functions is set on a compartment, 10 functions will be allocated per region. To target a specific region, a quota can use a region parameter.

In accordance with an embodiment, due to the hierarchical nature of compartment quotas, usage (e.g., of resources), resource usage of a sub-compartment counts as resource usage towards a main compartment. That is, for example, in a three-level compartment nest (parent compartment, child compartment, grandchild compartment), where each compartment and sub-compartment has a compartment quota policy attached to it, any resource usage by the grandchild compartment counts against a compartment quota of both the child compartment as well as the parent compartment.

In accordance for example, for example, suppose compartment resource quota 682 specifies that, compartment wide, compartment 660 may only utilize 10 virtual machines of type X. On creation of sub-compartment 670, sub compartment resource quota 684 specifies that, sub-compartment wide, sub compartment 670 may only utilize 8 virtual machines of type X. If, then, sub-compartment 670 utilizes its maximum capacity of virtual machines of type X (namely 8), then compartment 660, and any other sub-compartments thereof (e.g., sub-compartments not shown in the figure), can only utilize an addition 2 virtual machines of type X. The above example additionally applies to the tenancy resource quota 680 (i.e., the service limit) in a similar manner.

In accordance with an embodiment, compartment quotas can be evaluated following these guidelines. Within a policy, quota statements can be evaluated in order, and later statements can supersede previous statements that target the same resource. In cases where more than one policy is set for the same resource, the most restrictive policy can be applied. Service limits always take precedence over quotas. Although it is possible to specify a quota for a resource that exceeds the service limit for that resource, the service limit will still be enforced.

Figure 7:
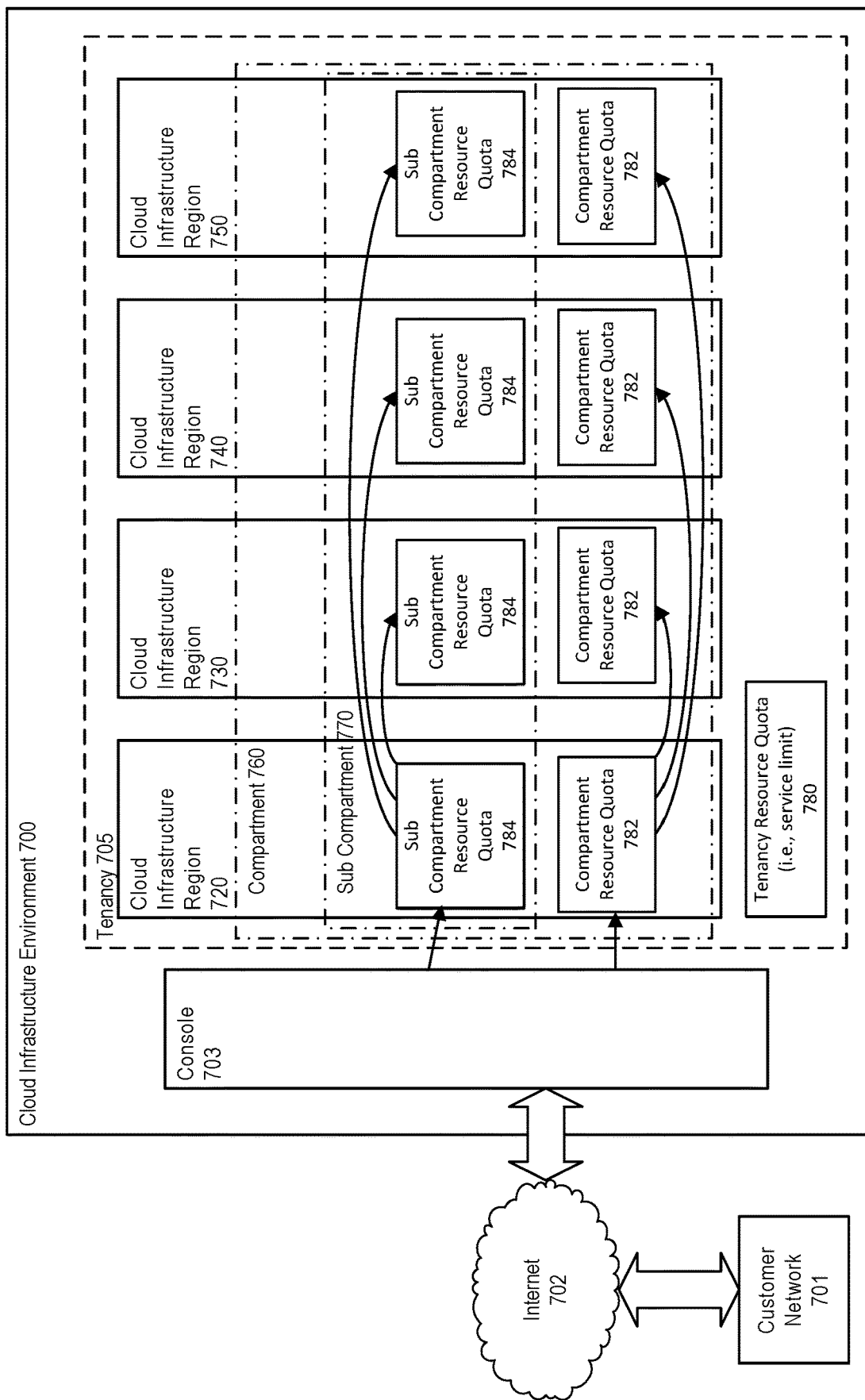
FIG. 7 shows a system for supporting compartment quotas in a cloud infrastructure environment, in accordance with an embodiment.

FIG. 7 shows a system for supporting compartment quotas in a cloud infrastructure environment, in accordance with an embodiment.

More specifically, FIG. 7 shows the replication of compartment quotas to different regions after creation/modification/deletion of a compartment quota within a region.

In accordance with an embodiment, as described above, instances of the cloud infrastructure environment 700 described above in FIG. 1 can be hosted in different regions, such as cloud infrastructure regions 720, 730, 740, 750. These can be accessed, as described above, via a console 703, SDK, or APIs, by customer networks 701 via a network 702, such as the internet.

In accordance with an embodiment, a customer network 701 can comprise, for example, a single computer, a network of customer computers, or other such networks.

In accordance with an embodiment, although not shown in the Figure, each cloud infrastructure region can comprise a number of services, each comprising a number of resources, such as management services, compute services, storage services, edge serves, network services, and physical infrastructure.

In accordance with an embodiment, a cloud infrastructure can be hosted in regions and availability domains. A region can be a localized geographic area, and an availability domain can be one or more data centers located within a region. A region is composed of one or more availability domains. Most cloud infrastructure resources can be either region-specific, such as a virtual cloud network, or availability domain-specific, such as a compute instance. Traffic between availability domains and between regions is encrypted.

In accordance with an embodiment, availability domains are isolated from each other, fault tolerant, and very unlikely to fail simultaneously. Because availability domains do not share infrastructure such as power or cooling, or the internal availability domain network, a failure at one availability domain within a region is unlikely to impact the availability of the others within the same region.

In accordance with an embodiment, availability domains within the same region can be connected to each other by a low latency, high bandwidth network, which can provide high-availability connectivity to the internet and on-premises, and to build replicated systems in multiple availability domains for both high-availability and disaster recovery.

In accordance with an embodiment, regions are independent of other regions and can be separated geographically (e.g., across countries or continents). This then leads to the deployment of an application within a region where the application would most likely be utilized the most frequently.

In accordance with an embodiment, however, applications can also be deployed in different regions for various reasons. This can include, for example, risk mitigation when events, such as weather systems, take a region offline. In addition, applications can be deployed in other regions for strategic reasons, such as tax domains or other business or social criteria.

In accordance with an embodiment, compartments allow clients to organize and control access to cloud resources. A compartment is a collection of related resources (such as instances, virtual cloud networks, block volumes) that can be accessed only by certain groups that have been given permission by an administrator. A compartment can be thought of as a logical group and not a physical container. When working within a console, a compartment can act as a filter for what is allowed to be viewed.

In accordance with an embodiment, compartments can have several layers, or levels, arranged in a hierarchical manner. For example, a tenancy 705 can be considered a root compartment that holds all of a client's cloud resources. Compartments can be organized in a hierarchical manner, such as compartment 760 being a level below the tenancy compartment, with sub compartment 770 being an additional layer below the compartment 760. In accordance with an embodiment, each compartment can be associated with one or more compartment resource quotas, such as tenancy resource quota 780 (i.e., the service limit discussed above), compartment resource quota 782, and sub compartment resource quota 784.

In accordance with an embodiment, during, upon, or after creation of a compartment, or sub compartment, such as compartment 760 and sub compartment 770, each corresponding compartment resource quota can be generated via, e.g., the console 703.

In accordance with an embodiment, because of the hierarchical nature of compartments, a compartment resource quota set can be set on a root/base level compartment. An administrator (having a level of access sufficient to manage and create resource quotas within the root compartment) can set quotas on the root compartment, as well as any nested or "child" compartments. Compartment resource quotas set on a parent/root compartment override any compartment resource quotas set on child compartments. In this way, an administrator of a parent compartment can create a quota on a child compartment that cannot be overridden by the child.

In accordance with an embodiment, quotas can have different scopes, and work at the availability domain, the region, or globally. There are a few important things to understand about scope when working with compartment quotas. When setting a quota at the availability domain (AD) level, the quota is allocated to each AD. So, for example, setting a quota of 2×7 VMs on a compartment actually sets a limit of 2 VMs per AD. Quotas can be written in such a way to target a specific AD. Likewise, regional quotas can apply to each region. For example, if a quota of 10 functions is set on a compartment, 10 functions will be allocated per region. To target a specific region, a quota can use a region parameter.

In accordance with an embodiment, due to the hierarchical nature of compartment quotas, usage (e.g., of resources), resource usage of a sub-compartment counts as resource usage towards a main compartment. That is, for example, in a three-level compartment nest (parent compartment, child compartment, grandchild compartment), where each compartment and sub-compartment has a compartment quota policy attached to it, any resource usage by the grandchild compartment counts against a compartment quota of both the child compartment as well as the parent compartment.

In accordance with an embodiment, quotas can be managed centrally in a single region and replicated globally. This reduces the effort required involved for managing quotas. For example, in looking at FIG. 7, a sub-compartment resource quota policy 784 and a compartment resource quota 782 can be initially defined within region 720. Upon creation, each of the resource quotas 782 and 784 can be replicated in to regions 730, 740, and 750. Such replication can be an asynchronous process that globally replicates the quota policies to the quotas data plane in each data center.

In accordance with an embodiment, compartment quotas provide the ability to completely turn off individual services.

As well, an algorithm for calculating resource usage over a hierarchy of resource compartments is provided. Quotas can consist of several primary components: quotas user interface; quotas control plane; quotas data plane; and quotas client SDKs.

In accordance with an embodiment, administrators can manage compartment quota policies through a user interface which behind the scenes calls the quotas control plane where the policies are stored. An asynchronous process globally replicates the data to the quotas data plane in each data center. Other cloud services integrate with the client SDK which can fetch the usage data from the service's persistent storage layer and the quota values from the quotas data plane. It then makes the decision whether the resource creation is permitted.

In accordance with an embodiment, there are a number of conditions that can be set in order for compartment quotas to be initiated. These include, but are not limited to: create/update/delete/list compartment level resource quotas; viewing compartment resource usage; compartment quotas can be set globally to apply to all regions/ADs; region/AD specific compartment quotas can be set and override globally defined quotas; compartment quotas can correspond to existing service quotas where applicable; setting and viewing compartment quotas can be possible through the console; quotas can be strictly enforced by each respective control plane; setting a quota should not fail based on current resource counts or parent compartment values; integrate with core services compute, DBaaS (database as a service) and block storage; achieving strong read after write consistency for get/list operations; ability to enforce zero quotas for free for teams unable to onboard; declarative quota statements via policies; and define compartment quotas to act as either a whitelist or a blacklist (i.e.. deny everything not set by a quota or allow everything).

In accordance with an embodiment, control planes can be extended to support compartment resource limits.

Figure 8:
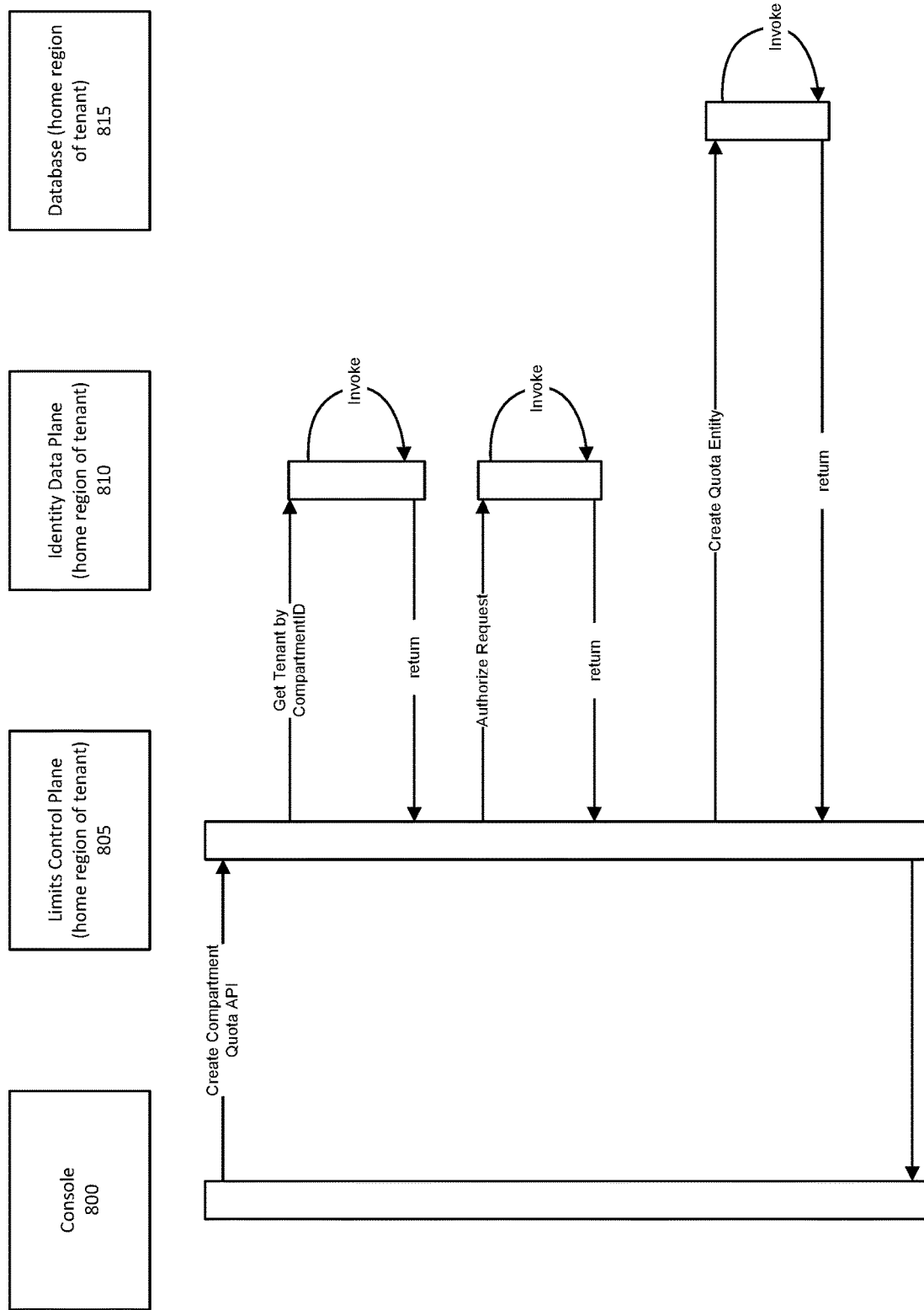
FIG. 8 is a flowchart of a method for creating a compartment quota, in accordance with an embodiment.

FIG. 8 is a flowchart of a method for creating a compartment quota, in accordance with an embodiment.

In accordance with an embodiment, a console 800, on receiving instructions indicative of a user of a tenant interaction to create a compartment quota, the console can call a limits control plane 805 (e.g., within a home region of the tenant) to create a compartment quota via an API.

In accordance with an embodiment, the call can comprise a compartment ID to which the compartment quota is directed.

In accordance with an embodiment, the limits control plane 805 can communicate with an identity data plane 810 (e.g., within the home region of the tenant). The communication can comprise the compartment ID of the target compartment, and the limits control plane can be requesting a tenant associated with the targeted compartment. The identity control plane can return the tenant.

In accordance with an embodiment, on receiving the tenant, the limits control plane can then see if the request to create the compartment quota is sufficiently authorized (e.g., user of tenant has sufficient permissions to instantiate such compartment quota on the targeted compartment). The limits control plane can do this by again communicating with the identity control plane.

In accordance with an embodiment, on determining that the request is authorized, the limits control plane can create the quota entity within a database 815 (e.g., Kiev) (e.g., within the home region of the tenant). A successfully creation of the compartment quota can then be returned to the console.

In accordance with an embodiment, the database 815 can be configured to store, and can store, all quotas associated with a tenant (or multiple tenants). That is, for example, both service level limits (that apply to an entire tenancy), as well as each of a plurality of compartment level quotas can be stored in one database (e.g., Kiev), with complete limits owned by one tenant.

Figure 9:
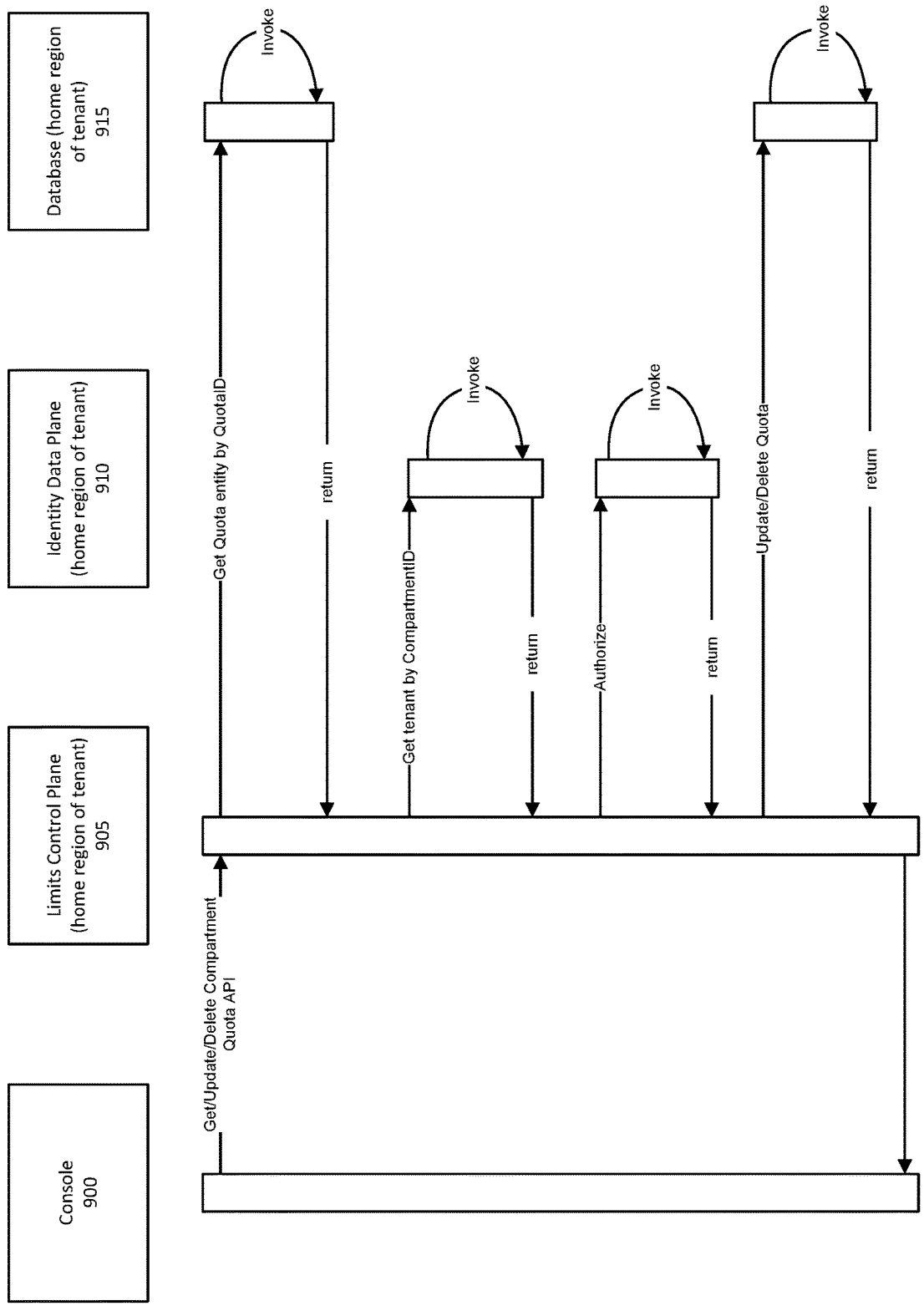
FIG. 9 is a flowchart of a method for modifying a compartment quota, in accordance with an embodiment.

FIG. 9 is a flowchart of a method for modifying a compartment quota, in accordance with an embodiment.

In accordance with an embodiment, a console 900, on receiving instructions indicative of a user of a tenant interaction to get, update, or delete a compartment quota, the console can call the database 915 to get the requested targeted compartment quota by the quota ID contained within the request.

In accordance with an embodiment, the call can comprise a quota ID to which the get/update/delete operation of the quota is directed.

In accordance with an embodiment, the limits control plane 905 can communicate with an identity data plane 910 (e.g., within the home region of the tenant). The communication can comprise the compartment ID of the target compartment, and the limits control plane can be requesting a tenant associated with the targeted compartment. The identity control plane can return the tenant.

In accordance with an embodiment, on receiving the tenant, the limits control plane can then see if the request to create the compartment quota is sufficiently authorized (e.g., user of tenant has sufficient permissions to instantiate such compartment quota on the targeted compartment). The limits control plane can do this by again communicating with the identity control plane.

In accordance with an embodiment, on determining that the request is authorized, the limits control plane can get/update/delete the compartment quota within a database 915 (e.g., Kiev) (e.g., within the home region of the tenant). A successfully creation of the compartment quota can then be returned to the console.

In accordance with an embodiment, the database 815 can be configured to store, and can store, all quotas associated with a tenant (or multiple tenants). That is, for example, both service level limits (that apply to an entire tenancy), as well as each of a plurality of compartment level quotas can be stored in one database (e.g., Kiev), with complete limits owned by one tenant.

Figure 10:
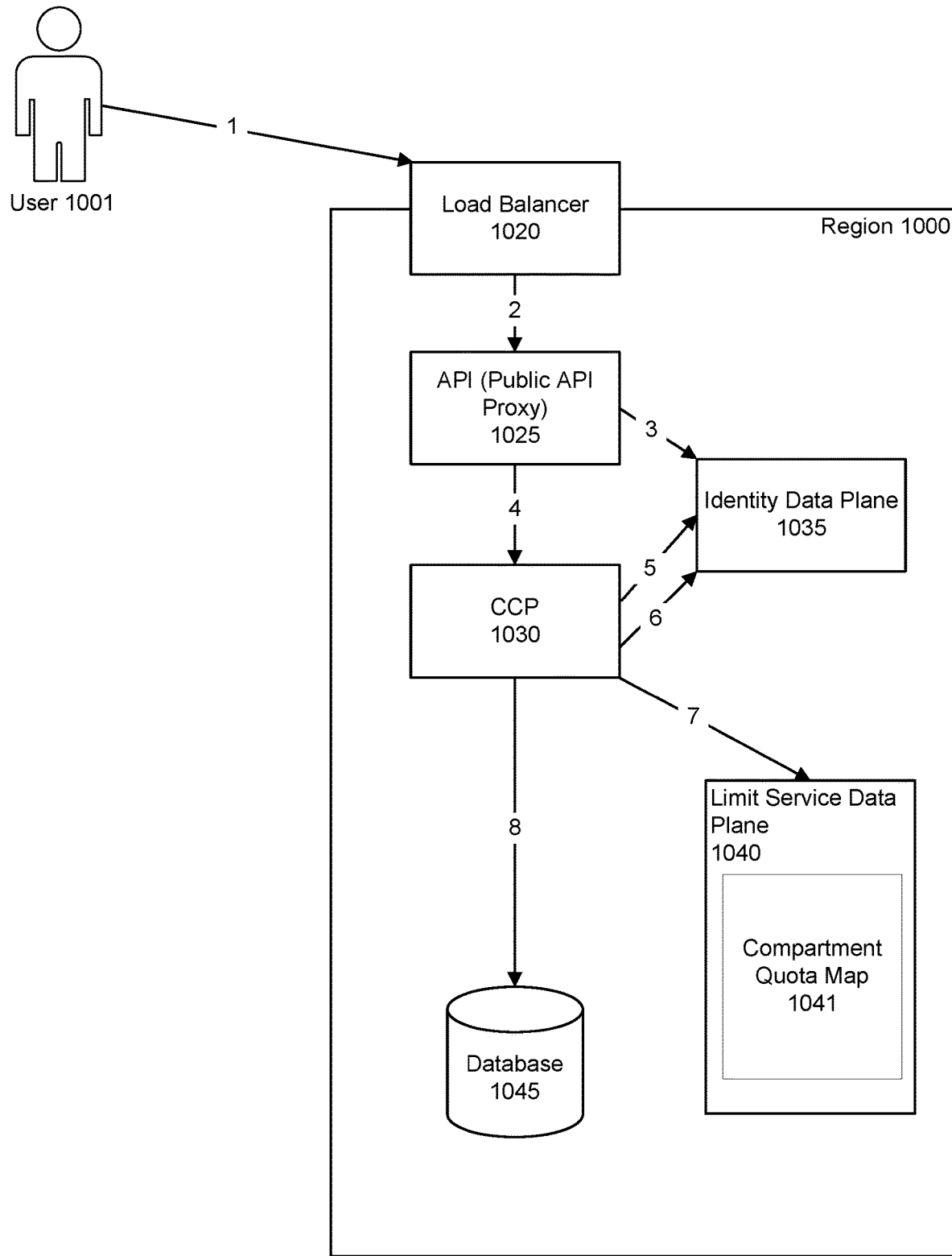
FIG. 10 shows an architecture for a system to enforcing compartment quotas in a cloud infrastructure environment, in accordance with an embodiment.

FIG. 10 shows an architecture for a system to enforcing compartment quotas in a cloud infrastructure environment, in accordance with an embodiment.

In accordance with an embodiment, FIG. 10 shows an architecture flow for a user launching an instance that requires a check against one or more compartment resource quotas.

In accordance with an embodiment, at step 1, instructions can be received from, e.g., a user 1001. The instructions can be indicative of a request to launch an instance in a region 1000, where the request specifies a compartment within the region.

In accordance with an embodiment, at step 2, a load balancer 1020 (e.g., Flamingo) can forward the request to an API, such as a public API proxy.

In accordance with an embodiment, at step 3, the API can perform an authentication at the identity data plane 1035. Such an authentication step can check both that a user has correct credentials (e.g., user credentials such as username and password, one-time password, or other authentication methods), and as well that the user 1001 has sufficient authorization within a region to perform the requested launching of an instance within the targeted compartment. If, for example, the user 1001 does not have sufficient authorization to launch the instance at the targeted compartment (for example, the user 1001 does only has authorization to launch a similar instance at a child compartment of the targeted compartment), then the API 1025 can deny the request. If the user does have sufficient authorization, then the API can allow the request to proceed.

In accordance with an embodiment, at step 4, the request to launch the instance can be forwarded to compute control plate (CCP) 1030. The CCP can then additionally authenticate the request at the identity data plane at step 5.

In accordance with an embodiment, at step 6, the compute control plane can call the identity data plane 1035 to fetch the compartment tree associated with the compartment to which the request is targeted, or the compartment tree for the entire tenancy to which the request is directed.

In accordance with an embodiment, at step 7, the compute control plane can fetch all compartment quotas for the tenancy or compartment tree from the limit service data plane 1040, which comprises a compartment quota map 1041. This can comprise a number of compartment quotas for the specific compartment to which the request is directed, as well as compartment quotas for the entire tree above the specific compartment.

In accordance with an embodiment, at step 8, the compute control plane can get the resource usage for the compartment from the database 1045, as well as check to see if the requested usage would violate any of the compartment quotas for any compartment along the tree comprising the specific compartment to which the request is directed. If the requested usage does not violate any compartment quota, then the request can be processed. If the requested usage would violate any of the compartment quotas along the compartment tree, then the request can be dropped and a message can be sent to notify the user.

In accordance with an embodiment, compartment quotas are applied to specific compartments within the tenancy. When the compartment tree is fetched, along with all associated compartment quotas, then the CCP can get the usage and update the usage based upon the request. From the database, as part of step 8, CCP can get the actual usage in each compartment. For the entire compartment tenancy, CCP can map each compartment ID to a number of counts (usage). Then CCP can map the entire compartment tree layout and the quotas that exist. The CCP can then ensure that the new request doesn't violate any of the quotas. If the request would exceed a quota, CCP can fail the request.

Figure 11:
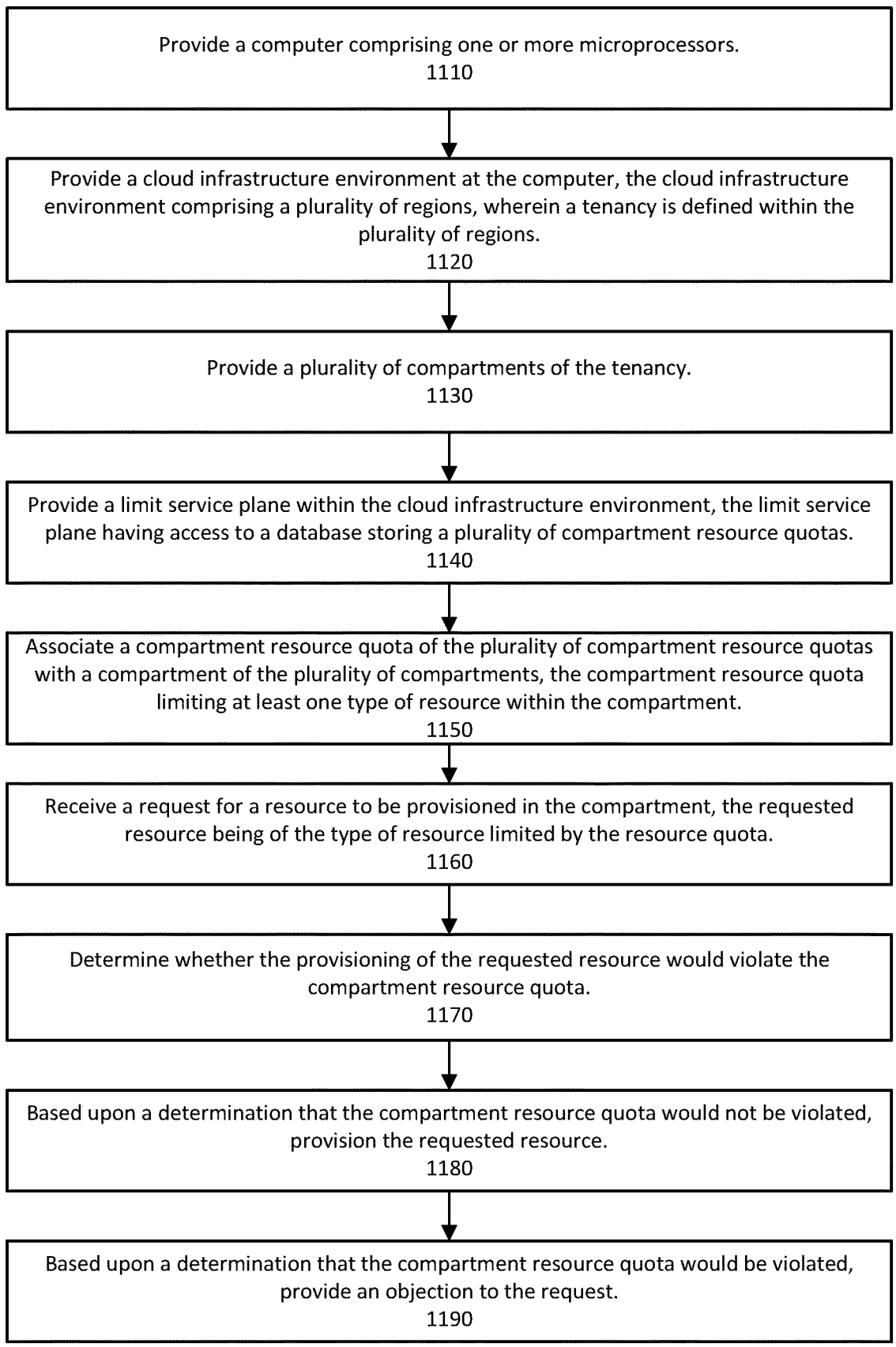
FIG. 11 is a flowchart of a method supporting compartment quotas in a cloud infrastructure environment, in accordance with an embodiment.

FIG. 11 is a flowchart of a method supporting compartment quotas in a cloud infrastructure environment, in accordance with an embodiment.

In accordance with an embodiment, at step 1110, the method can provide a computer comprising one or more microprocessors.

In accordance with an embodiment, at step 1120, the method can provide a cloud infrastructure environment at the computer, the cloud infrastructure environment comprising a plurality of regions, wherein a tenancy is defined within the plurality of regions.

In accordance with an embodiment, at step 1130, the method can provide a plurality of compartments of the tenancy.

In accordance with an embodiment, at step 1140, the method can provide a limit service data plane within the cloud infrastructure environment, the limit service data plane having access to a database storing a plurality of compartment resource quotas.

In accordance with an embodiment, at step 1150, the method can associate a compartment resource quota of the plurality of compartment resource quotas with a compartment of the plurality of compartments, the compartment resource quota limiting at least one type of resource within the compartment.

In accordance with an embodiment, at step 1160, the method can receive a request for a resource to be provisioned in the compartment, the requested resource being of the type of resource limited by the resource quota.

In accordance with an embodiment, at step 1170, the method can determine whether the provisioning of the requested resource would violate the compartment resource quota.

In accordance with an embodiment, at step 1180, the method can, based upon a determination that the compartment resource quota would not be violated, provision the requested resource.

In accordance with an embodiment, at step 1190, the method can, based upon a determination that the compartment resource quota would be violated, provide an objection to the request.

Quota Policy Language

In accordance with an embodiment, as described above, a cloud infrastructure environment can provide for the ability for customers to set resource quotas on a compartment. Quotas act like existing service limits except they are set by customers to restrict their own usage rather than by a cloud infrastructure environment. Service teams can check against these quotas in their control planes and hard block requests that exceed a quota. Quotas can be stored and accessed from a limits service, and be set by clients through the console or the REST API. In addition, the cloud infrastructure environment can support a declarative, human readable, quota policy language to be used in the creation of such compartment quotas.

In accordance with an embodiment, a compartment resource quota can be set in a similar manner as writing, for example, an identity policy. Both live in a compartment and can be written to target a different compartment. A resource quota can also be associated with a set of conditions that can be applied, such as, for example, region, availability domain, and overlaps.

In accordance with an embodiment, a resource quota can be configured by setting a statement syntax. In order to set a quota, the quota can establish a number of factors. Each quota can be unique within a service family (e.g. compute), and as such, each quota can define a target service along with a quota name. Next, a quota can define the value to set the quota to, as well as a compartment the quota targets. Finally, there are a set of conditions that can be included determine when this quota is applied.

In accordance with an embodiment, compartment quota policies can be written using an expressive human readable policy language. The policy language allows for rich expressiveness including the ability to both whitelist or blacklist resource usage through statement overrides. A whitelist allows all resources to be created except those that are explicitly denied. A blacklist allows no resources to be created except those that are explicitly allowed.

In accordance with an embodiment, compartment quotas can be set using policy statements written in a simple declarative language. There are, in general, three types of quota policy statements: 1) set—sets the maximum number of a cloud resource that can be used for a compartment; 2)

unset—resets quotas back to the default service limits; and 3) zero—removes access to a cloud resource for a compartment.

Figure 12A:
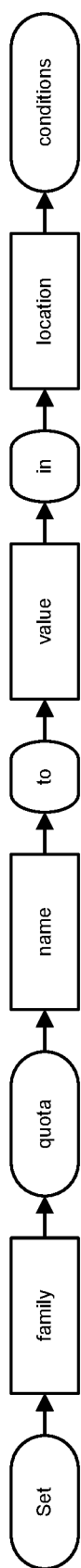
FIGS. 12a, 12b, and 12c are example compartment quota policy statements, in accordance with an embodiment.
Figure 12B:
Figure 12C:

FIGS. 12a, 12b, and 12c are example compartment quota policy statements, in accordance with an embodiment.

FIG. 12a shows a set quota policy, in accordance with an embodiment.

FIG. 12b shows an unset quota policy, in accordance with an embodiment.

FIG. 12c shows a zero quota policy, in accordance with an embodiment.

In accordance with an embodiment, the language components for each quota policy statement comprise the following components: 1) an action keyword—the action keyword can correspond to a type of quota being defined. This can be, for example, set, unset, or zero; 2) the name of the service family. This can be, for example: compute; 3) the quota or quotas keyword; 4) the name of the quota, which varies by service family. For example, a valid quota in the compute family can be "vm-standard2-16-count". In addition, wildcards can be used to specify a range of names. For example, "/vm-*/" matches all compute shapes that start with the letters "vm"; 5) a "for" set statements that sets a value of the quota; 6) and the compartment that the quota covers; 7) an optional condition can also be provided. For example where request.region='us-phoenix-1'. Such conditionals can include request. region and request.ad.

Figure 13:
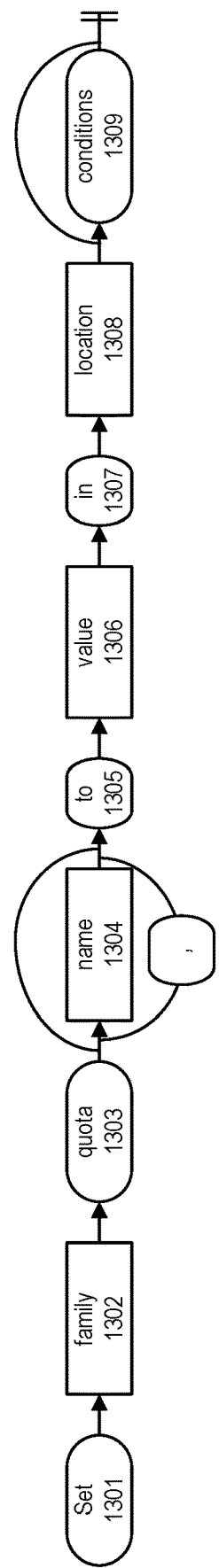
FIG. 13 illustrates an example of a quota policy statement, in accordance with an embodiment.

FIG. 13 illustrates an example of a quota policy statement, in accordance with an embodiment.

In accordance with an embodiment, the statement of FIG. 13 is a set 1301 statement, which is applied to a family 1302. The quota 1303 is applied to a name 1304 (e.g., a resource), which quota sets to 1305 a value 1306. The quota can be applied in 1307 a location 1308, and then conditions 1309 can be set as well.

In accordance with an embodiment, provided below are some exemplary quota policy statements, provided below are some examples along with an explanation of each quota policy.

In accordance with an embodiment, the quota policy:
Set Compute Quotas to 0 in Compartment My Compartment In accordance with an embodiment, the above quota policy would set all compute quotas to 0 in "MyCompartment", thereby not allowing any further resources to be created.

In accordance with an embodiment, the quota policy:

---
Set block-storage quota 'volume-count' to 10 in compartment My Compartment

---

In accordance with an embodiment, the above quota policy would set block storage quota for volume count to 10 in "MyCompartment".

In accordance with an embodiment, the quota policy:

---
Set compute quota 'VM.Dense101.16' to 10 in compartment MyCompartment where request.region = 'phx'

---

In accordance with an embodiment, the above quota policy would set the quota for VM.DenseIO1.16 Compute shapes to 10 on compartment MyCompartment in PHX.

In accordance with an embodiment, the quota policy:
Set Compute Quota/VM.*/to 10 in Compartment MyCompartment In accordance with an embodiment, a wildcard expression can also be used to match many names at once. The above quota policy sets the quota for each VM shape to 10, not the combined quota to 10.

In accordance with an embodiment, the quota policy format can require a specification of a quota family along with an optional name or list of names.

In accordance with an embodiment, the quota location 1008 can comprise a target compartment to which the quota applies. This is often different than the compartment where the quota resides and can be a descendant of it. The location can also be "tenancy" which is equivalent to specifying the root compartment.

Figure 14:
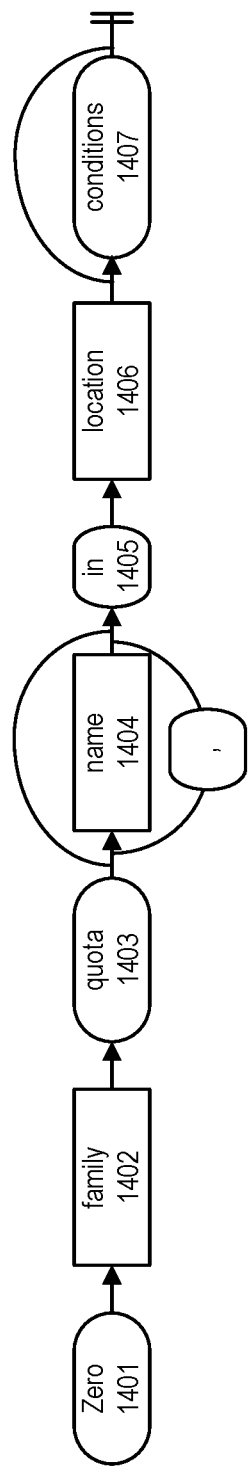
FIG. 14 illustrates an example of a quota policy statement, in accordance with an embodiment.

In accordance with an embodiment, another example of a quota policy statement is a zero statement. FIG. 14 illustrates an example of a quota policy statement, in accordance with an embodiment.

In accordance with an embodiment, the statement of FIG. 14 is a zero 1401 statement, which is applied to a family 1402. The quota 1403 is applied to a name 1404 (e.g., a resource). The zero quota is applied in 1405 a location 1406, and then conditions 1407 can be set as well.

In accordance with an embodiment, provided below are some exemplary quota policy statements, provided below are some examples along with an explanation of each quota policy.

In accordance with an embodiment, the quota policy:
Zero Compute Quota 'VMStandard2.32' in Compartment MyCompartment In accordance with an embodiment, the above quota policy statement applies to VM Standard 2.32 instance type in MyCompartment. Once this quota is set, a user will not be able to launch any of these instances (e.g., VM Standard 2.32) in that compartment.

In accordance with an embodiment, the quota policy languages can additionally support a whitelist. In other words, setting every quota in a family to 0 and allocating resources explicitly on top of this. This can be implemented by establishing a simple statement precedence rule, namely—when two or more statements evaluate to true within the same policy the last statement in the set will control.

In accordance with an embodiment, consider the below two quota policies to see how precedence works to support a whitelist.

---
Zero compute quotas in tenancy
Set compute quota 'VM.DenseIO1.16' to 10 in tenancy

---

In accordance with an embodiment, a base statement can be written that reduces all Compute quotas to 0. On top of this, a second statement can be written for VM.DenseIO1.16 which wants to allow up to 10. Importantly, this override only applies to statements written in the same policy. There is no precedence between statements from different policies, they must all be satisfied. This makes it impossible for a child compartment admin to override a quota in a parent compartment. Admins can safely give child compartment admins "manage all-resources" on the child and maintain proper quotas. Child compartment admins can only further reduce quotas that are already present within a parent compartment.

Figure 15:
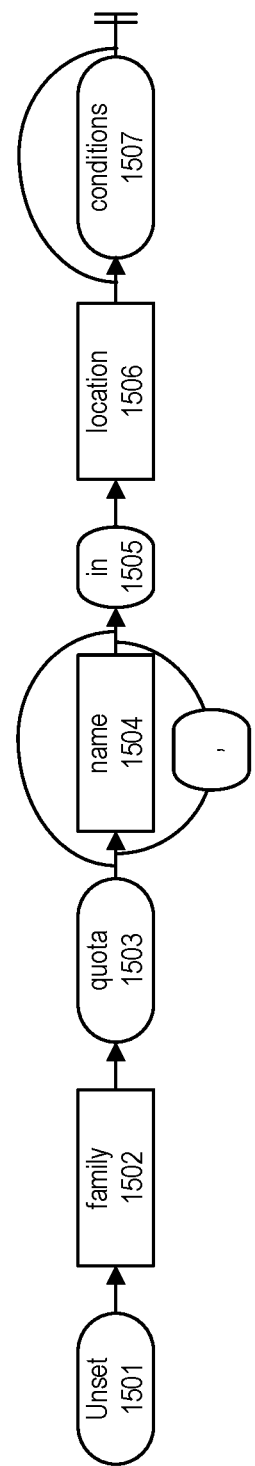
FIG. 15 illustrates an example of a quota policy statement, in accordance with an embodiment.

In accordance with an embodiment, another example of a quota policy statement is an unset statement. FIG. 15 illustrates an example of a quota policy statement, in accordance with an embodiment.

In accordance with an embodiment, the statement of FIG. 15 is an unset 1501 statement, which is applied to a family 1502. The quota 1503 is unset to a name 1504 (e.g., a resource), in 1505 a location 1506, with optional conditions 1507.

In accordance with an embodiment, re-working the above example with regard to precedence, the second quota policy can be unset so that there is no quota on VM DenseIO1.16.

---
Zero compute quotas in tenancy
Unset compute quota 'VM.DenseIO1.16' to 10 in tenancy

---

In accordance with an embodiment, as with the previous example, the unset does not work across different quota policies.

In accordance with an embodiment, within each service's control plane, there is a critical section (e.g., time) where the database transaction stays open. The longer this period of time extends, conflicts and failures start to creep in. In order to minimize this possible problem, quota policies can be considered and applied in a range of approximately 5 milliseconds.

In accordance with an embodiment, as described above, quotas can be enforced at the compartment level. Because of this, quotas can additionally be specified to set quotas on additional entities within compartments, such as users, groups and tags. For example, consider the below quota statement:

---
Set compute quota 'VM.DenseIO1.16' to 20 in tenancy where request.user = ocid1.user.dev..aaaaaaaan4xh2xpvzcmabc5m7pd7ioaovc2ktt56fvbhfy77y4v

---

The above allows for a quota to partially get placed on a user, but it doesn't ensure the user will get 20 instances since the quota is on the compartment and not the user. Instead, a quota can be specified that sets a quota for a user regardless of the current compartment usage.

Figure 16:
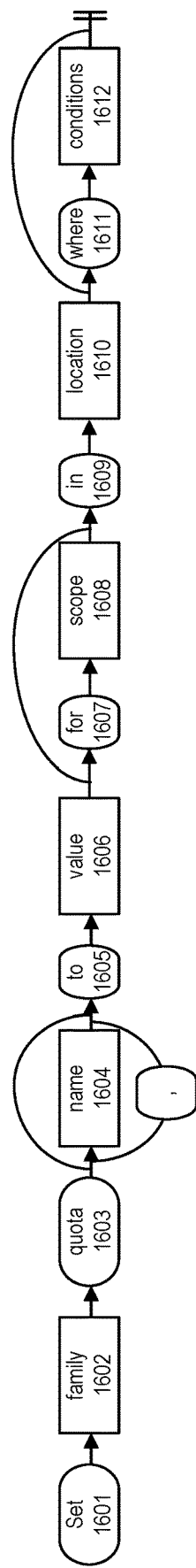
FIG. 16 illustrates an example of a quota policy statement, in accordance with an embodiment.

FIG. 16 illustrates an example of a quota policy statement, in accordance with an embodiment.

More specifically, FIG. 16 shows a quota policy statement that additionally includes a scope.

In accordance with an embodiment, the statement of FIG. 16 is a set 1601 statement, which is applied to a family 1602. The quota 1603 is applied to a name 1604 (e.g., a resource), which quota sets to 1605 a value 1606. The quota can be applied for 1607 a scope 1608, in 1609 a location 1610, where 1611 conditions 1612 can be set as well. Take the above compartment quota and re-writing it using the statement language of FIG. 16 then, the quota policy becomes:
Set Compute Quota 'VM.DenseIO1.16' to 10 for User MyUser in Tenancy In accordance with an embodiment, the quota policy language clearly expresses that this quota is applied to MyUser and not the compartment. This would be an entirely separate quota from the compartment quota, and all quota scopes (both the above quota policy as well as any compartment quota policy) would need to be satisfied when creating a resource.

Figure 17:
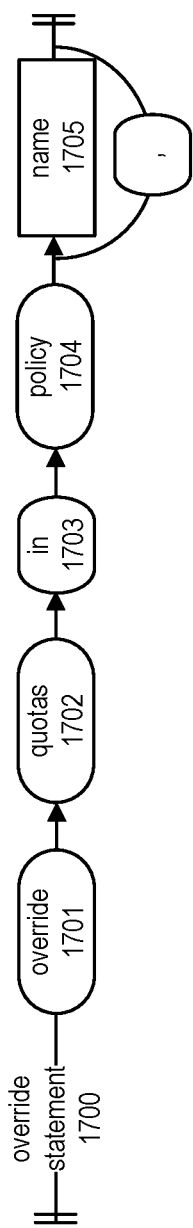
FIG. 17 illustrates an example of a quota policy statement, in accordance with an embodiment.

FIG. 17 illustrates an example of a quota policy statement, in accordance with an embodiment.

More specifically, FIG. 17 shows an override quota policy.

In accordance with an embodiment, precedence rules associated with compartment quotas do not allow for a statement in one policy to override a statement from a different policy. That means to implement a whitelist, the systems and methods are limited by the maximum number of statements in a single policy. To get around this, an explicit override statement can be utilized. This statement establishes the precedence of one policy over another. It's equivalent to having written the statements together as part of one long policy. In order for an override statement to apply, the policy must live in the same compartment In accordance with an embodiment, the override statement can comprise an override statement 1700, an override 1701, one or more other quotas 1702, in 1703 policy 1704, and a name 1705.

In accordance with an embodiment, consider the below override statement:
Override Quotas in Policy BasePolicy In accordance with an embodiment, the above override statement provides that any statements in this policy will override statements in BasePolicy. Note that overrides are transitive. If a overrides b and b overrides c, then a overrides c.

Figure 18:
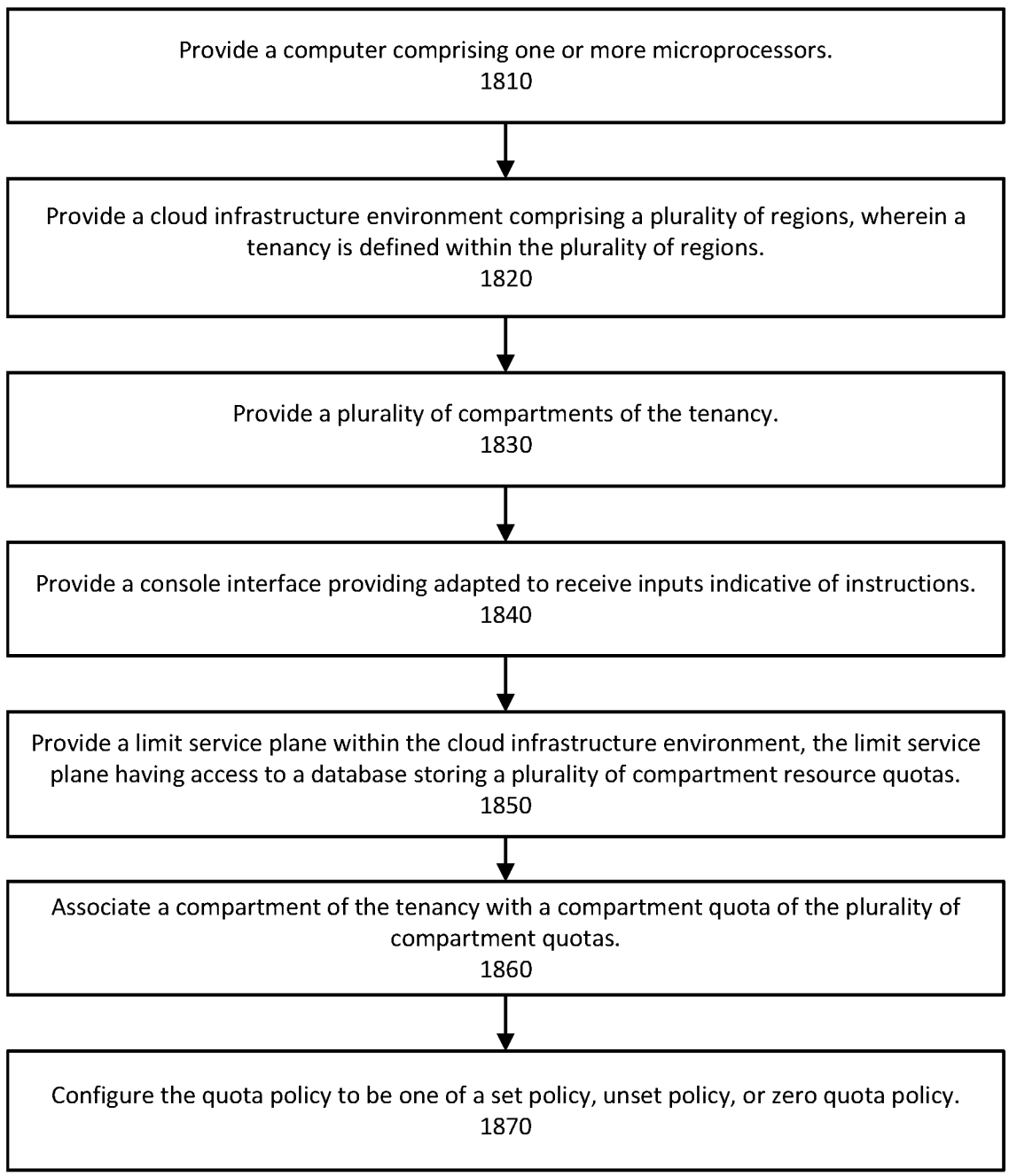
FIG. 18 is a flowchart of a method for supporting a quota policy language in a cloud infrastructure environment, in accordance with an embodiment.

FIG. 18 is a flowchart of a method for supporting a quota policy language in a cloud infrastructure environment, in accordance with an embodiment.

In accordance with an embodiment, at step 1810, the method can provide a computer comprising one or more microprocessors.

In accordance with an embodiment, at step 1820, the method can provide a cloud infrastructure environment comprising a plurality of regions, wherein a tenancy is defined within the plurality of regions.

In accordance with an embodiment, at step 1830, the method can provide a plurality of compartments of the tenancy.

In accordance with an embodiment, at step 1840, the method can provide a console interface providing adapted to receive inputs indicative of instructions.

In accordance with an embodiment, at step 1850, the method can provide a limit service data plane within the cloud infrastructure environment, the limit service data plane having access to a database storing a plurality of compartment resource quotas, In accordance with an embodiment, at step 1860, the method can associate a compartment of the tenancy with a compartment quota of the plurality of compartment quotas.

In accordance with an embodiment, at step 1870, the method can configure the quota policy to be one of a set policy, unset policy, or zero quota policy.
Usage Calculation Process (Algorithm)

In accordance with an embodiment, systems and methods can support a usage calculation process or algorithm to determine whether a requested transaction violates any limits or quotas with regard to compartments.

In accordance with an embodiment, a usage calculation method can provide an SDK for both evaluating quotas or limits, as well as counting resources per compartment.

In accordance with an embodiment, the process can be distributed amongst a number of systems and sub-systems within a cloud infrastructure environment.

In accordance with an embodiment, FIG. 10 shows an architecture flow for a user launching an instance that requires a check against one or more compartment resource quotas.

Figure 19:
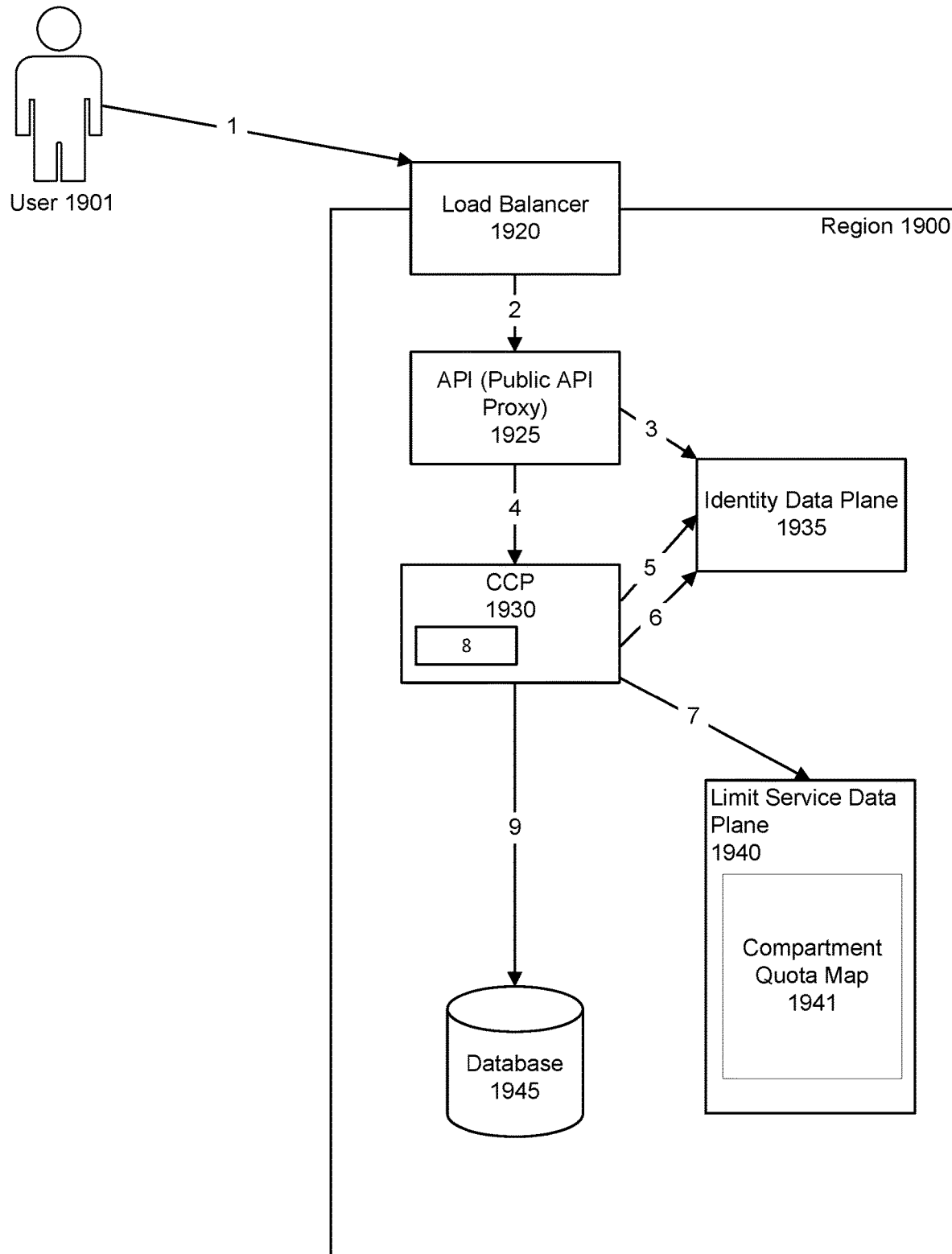
FIG. 19 shows an architecture for a system to enforcing compartment quotas in a cloud infrastructure environment, in accordance with an embodiment.

FIG. 19 shows an architecture for a system to enforcing compartment quotas in a cloud infrastructure environment, in accordance with an embodiment.

In accordance with an embodiment, at step 1, instructions can be received from, e.g., a user 1901. The instructions can be indicative of a request to launch an instance in a region 1900, where the request specifies a compartment within the region.

In accordance with an embodiment, at step 2, a load balancer 1920 (e.g., Flamingo) can forward the request to an API, such as a public API proxy.

In accordance with an embodiment, at step 3, the API can perform an authentication at the identity data plane 1935. Such an authentication step can check both that a user has correct credentials (e.g., user credentials such as username and password, one-time password, or other authentication methods), and as well that the user 1901 has sufficient authorization within a region to perform the requested launching of an instance within the targeted compartment. If, for example, the user 1901 does not have sufficient authorization to launch the instance at the targeted compartment (for example, the user 1901 does only has authorization to launch a similar instance at a child compartment of the targeted compartment), then the API 1925 can deny the request. If the user does have sufficient authorization, then the API can allow the request to proceed.

In accordance with an embodiment, at step 4, the request to launch the instance can be forwarded to compute control plate (CCP) 1930. The CCP can then additionally authenticate the request at the identity data plane at step 5.

In accordance with an embodiment, at step 6, the compute control plane can call the identity data plane 1935 to fetch the compartment tree associated with the compartment to which the request is targeted, or the compartment tree for the entire tenancy to which the request is directed.

In accordance with an embodiment, at step 7, the compute control plane can fetch all compartment quotas for the tenancy or compartment tree from the limit service data plane 1940, which comprises a compartment quota map 1941. This can comprise a number of compartment quotas for the specific compartment to which the request is directed, as well as compartment quotas for the entire tree above the specific compartment.

In accordance with an embodiment, at step 8, the compute control plane can calculate the total usage for each compartment in the lineage. This total usage is equal to the sum of compartment's usage and the total usage of each child compartment recursively down the hierarchy.

In accordance with an embodiment, the CCP 1930 can compare each limit/quota against the total usage for that compartment. If any limit/quota is violated, the CCP can return an objection indicating which quotas and/or limits the prospective resource would exceed. In addition to the objection, the CCP can also return an amount the prospective resource would exceed a quota by.

In accordance with an embodiment, if the CCP determines that the prospective resource would be allowed, then at step 9, the transaction can be committed at the database 1945.

Figure 20:
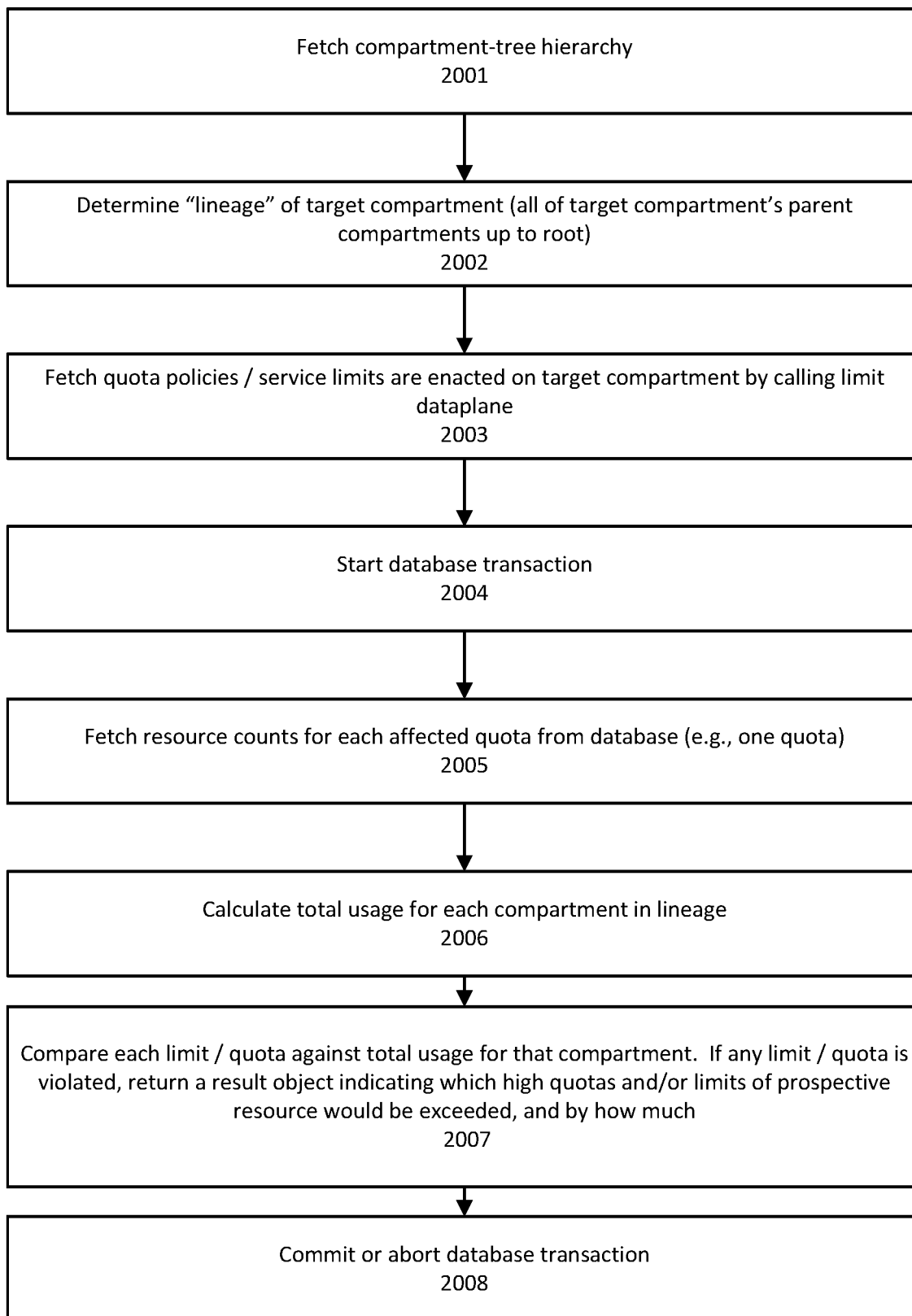
FIG. 20 is a flowchart of a method for supporting a usage calculation process in a cloud infrastructure environment, in accordance with an embodiment.

FIG. 20 is a flowchart of a method for supporting a usage calculation process in a cloud infrastructure environment, in accordance with an embodiment.

In accordance with an embodiment, at step 2001, the process can fetch the compartment-tree hierarchy from, for example, an identity data plane. This can comprise single request (e.g., HTTP) with the amount of data getting returned growing linearly with the number of compartments.

In accordance with an embodiment, at step 2002, the process can determine a lineage of a target compartment (i.e., the compartment to which a transaction is targeted). The lineage can grow linearly with the height of the compartment tree.

In accordance with an embodiment, at step 2003, the method can fetch the quota policies/service limits that are enacted on the target compartment by calling the limit service data plane. In doing so, the process can fetch both quotas and service limit requests within a single limit service data plane request.

In accordance with an embodiment, at step 2004, the database transaction can be started.

In accordance with an embodiment, at step 2005, resource counts for each affected quota from the database bucket can be fetched. For each quota, the process can check against an object from the database with the entire tenant usage data for that quota. The data returned can grow linearly with the number compartments in that tenant that have usage of that resource/quota.

In accordance with an embodiment, at step 2006, the process can calculate the total usage for each compartment in the linage. The total usage can be an aggregate of the compartment's usage plus the total usage of all children, recursively down the tree. This operation is linear in respect to the number of compartments in a tree. The process can perform a recursive depth first tree traversal with counts coming up the tree.

In accordance with an embodiment, at step 2007, the process can compare each limit/quota against the total usage for that compartment. If a limit/quota is violated, the process can return a result object indicating which quota or limit was violated, as well as by how much.

In accordance with an embodiment, at step 2008, the process can commit the transaction to the database.

Figure 21:
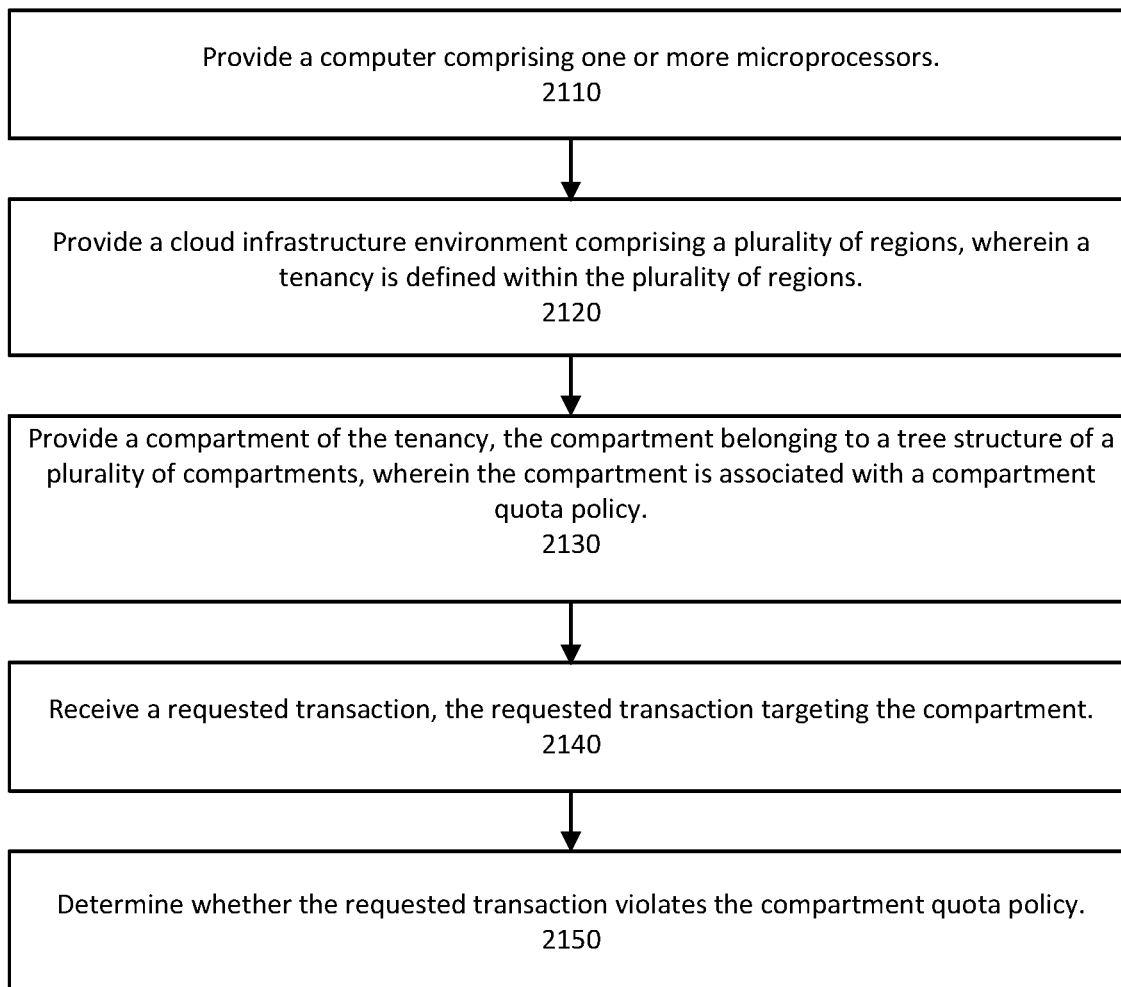
FIG. 21 is a flowchart of a method for supporting a usage calculation process in a cloud infrastructure environment, in accordance with an embodiment.

FIG. 21 is a flowchart of a method for supporting a usage calculation process in a cloud infrastructure environment, in accordance with an embodiment.

In accordance with an embodiment, at step 2110, the method can provide a computer comprising one or more microprocessors.

In accordance with an embodiment, at step 2120, the method can provide a cloud infrastructure environment comprising a plurality of regions, wherein a tenancy is defined within the plurality of regions.

In accordance with an embodiment, at step 2130, the method can provide a compartment of the tenancy, the compartment belonging to a tree structure of a plurality of compartments, wherein the compartment is associated with a compartment quota policy.

In accordance with an embodiment, at step 2140, the method can receive a requested transaction, the requested transaction targeting the compartment.

In accordance with an embodiment, at step 2150, the method can determine whether the requested transaction violates the compartment quota policy.

In accordance with an embodiment, the requested transaction can request a type of resource.

In accordance with an embodiment, the determining of described at step 2150 can comprise additional steps, comprising: fetching a compartment-tree hierarchy, the compartment-tree hierarchy comprising the targeted compartment; determining a lineage of the targeted compartment; fetching, by calling a limit service data plane, a plurality of compartment quotas that are enacted on the targeted compartment, wherein the plurality of compartment quotas comprises the compartment quota policy, and wherein each of the plurality of compartment quotas belong to a compartment within the compartment-tree hierarchy; starting the requested transaction at a database; fetching resource counts for each of the plurality of compartment quotas quota from the database, each resource count comprising a count of the requested resource type; calculating a total usage of the requested resource type for each compartment in the determined linage, wherein the total usage for each compartment comprises an aggregate of a usage of a compartment and a total usage of each child compartment; and comparing each of the plurality of compartment quotas to the total usage for each compartment.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for supporting compartment quotas in a cloud infrastructure environment, comprising:
a computer comprising one or more microprocessors;
a cloud infrastructure environment comprising a plurality of regions, wherein a tenancy is defined within the plurality of regions;
a plurality of compartments of the tenancy;
a limit service data plane within the cloud infrastructure environment, the limit service data plane having access to a database storing a plurality of compartment resource quotas,
wherein a compartment resource quota of the plurality of compartment resource quotas is associated with a compartment of the plurality of compartments, the compartment resource quota limiting at least one type of resource within the compartment;
wherein a request for a resource to be provisioned in the compartment is received, the requested resource being of the type of resource limited by the resource quota;
wherein a determination is made whether the provisioning of the requested resource would violate the compartment resource quota;
wherein, based upon a determination that the compartment resource quota would not be violated, provisioning the requested resource; and
wherein, based upon a determination that the compartment resource quota would be violated, providing an objection to the request.

2. The system of claim 1,
wherein the plurality of compartments is arranged in a hierarchical manner, and
wherein a mapping of the arrangement of the plurality of compartments arranged in a hierarchical manner is stored in a location accessible by the limit data service plane.

3. The system of claim 2,
wherein the plurality of compartment resource quotas is arranged in a hierarchical manner corresponding to the hierarchical arrangement of the plurality of compartments.

4. The system of claim 1,
wherein the cloud infrastructure environment comprises a plurality of regions, and wherein the tenancy is defined across the plurality of regions.

5. The system of claim 4,
wherein each of the plurality of compartments is defined across the plurality of regions.

6. The system of claim 5,
wherein the compartment resource quota is defined within a first region of the plurality of regions.

7. The system of claim 6,
wherein upon the compartment resource quota being defined within the first region of the plurality of regions, the compartment resource quota is replicated in each other region of the plurality of regions.

8. A method for supporting compartment quotas in a cloud infrastructure environment, comprising:
providing a computer comprising one or more microprocessors;
providing a cloud infrastructure environment at the computer, the cloud infrastructure environment comprising a plurality of regions, wherein a tenancy is defined within the plurality of regions;
providing a plurality of compartments of the tenancy;
providing a limit service data plane within the cloud infrastructure environment, the limit service data plane having access to a database storing a plurality of compartment resource quotas,
associating a compartment resource quota of the plurality of compartment resource quotas with a compartment of the plurality of compartments, the compartment resource quota limiting at least one type of resource within the compartment;

receiving a request for a resource to be provisioned in the compartment, the requested resource being of the type of resource limited by the resource quota;

determining whether the provisioning of the requested resource would violate the compartment resource quota;

based upon a determination that the compartment resource quota would not be violated, provisioning the requested resource; and based upon a determination that the compartment resource quota would be violated, providing an objection to the request.

9. The method of claim 8, further comprising
arranging the plurality of compartments in a hierarchical manner, and
arranging a mapping of the arrangement of the plurality of compartments in a hierarchical manner is stored in a location accessible by the limit data service plane.

10. The method of claim 9, further comprising:
arranging the plurality of compartment resource quotas in a hierarchical manner corresponding to the hierarchical arrangement of the plurality of compartments.

11. The method of claim 8,
wherein the cloud infrastructure environment comprises a plurality of regions, and wherein the tenancy is defined across the plurality of regions.

12. The method of claim 11, further comprising:
defining each of the plurality of compartments across the plurality of regions.

13. The method of claim 12, further comprising
defining the compartment resource quota within a first region of the plurality of regions.

14. The method of claim 13,
upon the compartment resource quota being defined within the first region of the plurality of regions, replicating the compartment resource quota in each other region of the plurality of regions.

15. A non-transitory computer readable storage medium having instructions thereon for supporting compartment quotas in a cloud infrastructure environment, which when read and executed by a computer cause the computer to perform steps comprising:
providing a computer comprising one or more microprocessors;
providing a cloud infrastructure environment at the computer, the cloud infrastructure environment comprising a plurality of regions, wherein a tenancy is defined within the plurality of regions;
providing a plurality of compartments of the tenancy;
providing a limit service data plane within the cloud infrastructure environment, the limit service data plane having access to a database storing a plurality of compartment resource quotas, associating a compartment resource quota of the plurality of compartment resource quotas with a compartment of the plurality of compartments, the compartment resource quota limiting at least one type of resource within the compartment;

receiving a request for a resource to be provisioned in the compartment, the requested resource being of the type of resource limited by the resource quota;

determining whether the provisioning of the requested resource would violate the compartment resource quota;

based upon a determination that the compartment resource quota would not be violated, provisioning the requested resource; and based upon a determination that the compartment resource quota would be violated, providing an objection to the request.

16. The non-transitory computer readable storage medium of claim 15, the steps further comprising
arranging the plurality of compartments in a hierarchical manner, and
arranging a mapping of the arrangement of the plurality of compartments in a hierarchical manner is stored in a location accessible by the limit service data plane.

17. The non-transitory computer readable storage medium of claim 16, the steps further comprising:
arranging the plurality of compartment resource quotas in a hierarchical manner corresponding to the hierarchical arrangement of the plurality of compartments.

18. The non-transitory computer readable storage medium of claim 15,
wherein the cloud infrastructure environment comprises a plurality of regions, and wherein the tenancy is defined across the plurality of regions.

19. The non-transitory computer readable storage medium of claim 18, the steps further comprising:
defining each of the plurality of compartments across the plurality of regions.

20. The non-transitory computer readable storage medium of claim 19, the steps further comprising
defining the compartment resource quota within a first region of the plurality of regions; and
upon the compartment resource quota being defined within the first region of the plurality of regions, replicating the compartment resource quota in each other region of the plurality of regions.

* * * * *

UNITED STATES PATENT AND TRADEMARK OFFICE
CERTIFICATE OF CORRECTION

PATENT NO. : 11,646,975 B2
APPLICATION NO. : 16/986162
DATED : May 9, 2023
INVENTOR(S) : Rushton et al.

It is certified that error appears in the above-identified patent and that said Letters Patent is hereby corrected as shown below:

On the Title Page

On page 2, Column 1, under U.S. Patent Documents, Line 40, delete "Sharif" and insert -- Sharifi --, therefor.

On page 3, Column 2, under U.S. Other Publication, Line 11, delete "v2 5.19" and insert -- v2.5.19 --, therefor.

In the Specification

In Column 1, Line 25, delete "2020;" and insert -- 2020 --, therefor.

In Column 1, Lines 25-26, delete "Patent Application No." and insert -- Publication No. --, therefor.

In Column 1, Line 31, after "U.S." delete "Patent Application".

In Column 1, Line 32, delete "11,2021;" and insert -- 11, 2021; --, therefor.

In Column 1, Line 63, delete "laaS" and insert -- IaaS --, therefor.

In Column 2, Line 4, delete "laaS" and insert -- IaaS --, therefor.

In Column 2, Line 7, delete "laaS" and insert -- IaaS --, therefor.

In Column 2, Line 9, delete "laaS" and insert -- IaaS --, therefor.

In Column 2, Line 12, delete "laaS" and insert -- IaaS --, therefor.

In Column 6, Lines 17-18, delete "infrastructure" and insert -- infrastructure. --, therefor.

Signed and Sealed this
Twenty-seventh Day of February, 2024

Katherine Kelly Vidal
*Director of the United States Patent and Trademark Office*

CERTIFICATE OF CORRECTION (continued)
U.S. Pat. No. 11,646,975 B2

In Column 10, Line 35, delete "Audit" and insert -- Audit. --, therefor.

In Column 16, Line 7, delete "automatically be" and insert -- automatically --, therefor.

In Column 18, Line 47, delete "for example, for example," and insert -- for example, --, therefor.

In Column 21, Line 34, delete "(i.e.." and insert -- (i.e. --, therefor.

In Column 28, Line 9, delete "compartment" and insert -- compartment. --, therefor.

In Column 28, Line 47, delete "quotas," and insert -- quotas. --, therefor.